(12) United States Patent
Kotler et al.

(10) Patent No.: US 12,493,944 B2
(45) Date of Patent: Dec. 9, 2025

(54) OPTIMIZATION OF THE RECIPE OF AN EXAMINATION TOOL

(71) Applicant: Applied Materials Israel Ltd., Rehovot (IL)

(72) Inventors: Yigal Kotler, Nir Eliyahu (IL); Riva Levit, Ashdod (IL); Ido Kofler, Givatayim (IL); Nir Baram, Ness Ziona (IL)

(73) Assignee: Applied Materials Israel Ltd., Rehovot (IL)

( * ) Notice: Subject to any disclaimer, the term of this patent is extended or adjusted under 35 U.S.C. 154(b) by 265 days.

(21) Appl. No.: 18/093,302

(22) Filed: Jan. 4, 2023

(65) Prior Publication Data

US 2024/0221146 A1    Jul. 4, 2024

(51) Int. Cl.
G06K 9/00    (2022.01)
G06T 7/00    (2017.01)
G06V 10/14    (2022.01)
H01L 21/66    (2006.01)

(52) U.S. Cl.
CPC ............ *G06T 7/0006* (2013.01); *G06V 10/14* (2022.01); *H01L 22/12* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 7,924,420 | B2* | 4/2011 | Shomrony | G01N 21/9501 356/237.5 |
| 10,373,796 | B2* | 8/2019 | Kim | H01J 37/222 |
| 10,665,504 | B2* | 5/2020 | Anikitchev | H01L 21/76883 |
| 11,788,973 | B2* | 10/2023 | Hiroi | G03F 1/84 356/237.5 |
| 12,039,716 | B2* | 7/2024 | Hiroi | G01N 21/9501 |
| 2005/0105791 | A1* | 5/2005 | Lee | G01N 21/47 382/145 |
| 2016/0293379 | A1* | 10/2016 | Kim | H01J 37/28 |
| 2022/0334554 | A1* | 10/2022 | Feng | H01L 22/12 |

* cited by examiner

*Primary Examiner* — Shervin K Nakhjavan
(74) *Attorney, Agent, or Firm* — Lowenstein Sandler LLP

(57) ABSTRACT

There are provided methods and systems to automatically determine, for acquisition by an examination system, of a plurality of regions covering a plurality of dies of a specimen, along a first direction and/or along a second direction orthogonal to the first direction. The dimension of the region along the first direction is selected to enable optimizing a total level of overlap of slices acquired by the examination system to cover the plurality of regions. The dimension of the region along the second direction enables maximizing a total parallel computation power used by the examination system to process an image of each region.

20 Claims, 26 Drawing Sheets

| 305 | 310 |
|---|---|
| 0.425 | 1.05 |
| 0.765 | 1.68 |
| 1.02 | 2.53 |
| 1.3175 | 3.74 |
| 1.7 | 4.95 |
| 2.125 | 5.37 |
| .... | .... |

300

| 751 | 752 |
|---|---|
| 0.425 | 1.5 |
| 0.765 | 2.7 |
| 1.02 | 3.6 |
| 1.3175 | 4.65 |
| 1.7 | 6 |
| 2.125 | 7.5 |
| .... | .... |

750

OPTIMIZATION OF THE RECIPE OF AN EXAMINATION TOOL

TECHNICAL FIELD

The presently disclosed subject matter relates, in general, to the field of examination of a specimen, and more specifically, to automating the examination of a specimen.

BACKGROUND

Current demands for high density and performance associated with ultra large-scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to measure dimensions of the specimens (metrology), and/or to detect and classify defects on specimens (e.g., Automatic Defect Classification (ADC), Automatic Defect Review (ADR), etc.).

General Description

In accordance with certain aspects of the presently disclosed subject matter, there is provided a system comprising a processor and memory circuitry (PMC), the PMC being configured to obtain a dimension $W_{spot}$ of an illumination spot of an examination system, enabling the examination system to acquire, along a scanning direction, slices of a semiconductor specimen comprising a plurality of dies, obtain data informative of at least one dimension $D_{die\_X}$ of each die of the plurality of dies of the semiconductor specimen, wherein said dimension is defined along a direction orthogonal to the scanning direction, use $W_{spot}$ to determine, along said direction, a dimension $D_{region\_X}$ of each region of a plurality of regions to acquire in the semiconductor specimen, wherein the dimension $D_{region\_X}$ is larger than the dimension $D_{die\_X}$, wherein the dimension $D_{region\_X}$ is selected to enable generation of an optimized recipe, in which acquisition of the plurality of regions by the examination system is associated with a total level of overlap between slices acquired by the examination system which meets an optimization criterion, and use the dimension $D_{region\_X}$ to enable generation of said optimized recipe for the examination system, thereby enabling acquisition of the plurality of regions of the specimen by the examination system.

According to some embodiments, each region covers a plurality of dies of the specimen and areas separating dies of said plurality of dies.

According to some embodiments, the dimension $D_{region\_X}$ is selected to enable each region of the plurality of regions to cover a number N of dies of the specimen, with N an integer which is equal to or greater than two.

According to some embodiments, the specimen comprises a plurality of extended dies, each extended die comprising a die and one or more areas separating said die from one or more other dies, wherein the dimension $D_{region\_X}$ is selected to enable each region of the plurality of regions to cover N extended dies, with N an integer equal to or greater than two.

According to some embodiments, the optimization criterion enables an impact of the total level of overlap of the slices of the optimized recipe on a throughput of the examination system to be below a threshold.

According to some embodiments, for an unoptimized recipe in which a plurality of areas is acquired by the examination system, wherein each area of the plurality of areas has the dimension $D_{die\_X}$ along the direction orthogonal to the scanning direction, a first total level of overlap of slices acquired by the examination system is obtained, for the optimized recipe in which a plurality of regions is acquired by the examination system, wherein each region has the dimension $D_{region\_X}$ along the direction orthogonal to the scanning direction, a second total level of overlap of slices acquired by the examination system is obtained, and wherein the second total level of overlap is smaller than the first total level of overlap.

According to some embodiments, the system is configured to select a dimension $D_{region\_X}$ which both minimizes a number N of dies covered by each region along said direction orthogonal to the scanning direction, while enabling the total level of overlap of the slices to meet the optimization criterion.

According to some embodiments, the system is configured to use a database which stores, for each of a plurality of different values of a dimension of an illumination spot of the examination system, a threshold indicative of a minimal dimension of each region of the plurality of regions to acquire in the specimen, said threshold enabling a total level of overlap between slices acquired by the examination tool for acquiring said plurality of regions, to meet the optimization criterion.

According to some embodiments, for a given dimension $W_{spot\_1}$ of the illumination spot, and a given dimension $D_{die\_X\_1}$ of each die of the specimen, the system is configured to perform a comparison between the given dimension $D_{die\_X\_1}$ and a threshold $D_{region\_X\_threshold\_1}$ associated with the given dimension $W_{spot\_1}$ in the database, and perform (i) or (ii): (i) using said comparison to determine whether determination of a plurality of regions each having a larger dimension than $D_{die\_X\_1}$ is required to generate the optimized recipe, or (ii) upon determination that a plurality of regions each having a larger dimension than $D_{die\_X\_1}$ is required to generate the optimized recipe, using $D_{region\_X\_threshold\_1}$ to determine the dimension $D_{region\_X}$ of each region of the plurality of regions.

According to some embodiments, the PMC is configured to obtain input data $D_{geometrical\_die}$ informative of one or more geometrical properties of elements present in a die of the specimen, and use said data $D_{geometrical\_die}$ to generate data $D_{geometrical\_region}$ informative of one or more geometrical properties of elements present in each region covering at least two dies.

According to some embodiments, the examination system is operative to perform, after acquisition of a given region of the plurality of regions, a processing of an image of said given region to determine data informative of said given region, wherein the PMC is operative to indicate to the examination system a location of areas separating dies within the given region.

According to some embodiments, the examination system is operative to determine, for at least one given region covering at least a first die and a second die of the specimen, data $D_{defect\_region}$ informative of the given region in a referential of the given region, wherein the PMC is operative to convert data $D_{defect\_region}$ into first data $D_{defect\_die\_1}$ informative of the first die expressed in a referential of the first die and second data $D_{defect\_die\_2}$ informative of the second die expressed in a referential of the second die.

According to some embodiments, the examination system is operative to process an image of a die using a total parallel computation power selected by the examination system, wherein the system is configured to obtain data informative of at least one dimension $D_{die\_Y}$ of each die of the plurality of dies along the scanning direction, use $D_{die\_Y}$ and the dimension $W_{spot}$ to determine a dimension $D_{region\_Y}$ of each region of the plurality of regions to acquire in the semiconductor specimen, wherein the dimension $D_{region\_Y}$ is determined along said scanning direction and is larger than the dimension $D_{die\_Y}$, wherein the dimension $D_{region\_Y}$ is selected to enable generation of an optimized recipe for which each region of the plurality of regions acquired by the examination system is associated with a total parallel computation power used by the examination system for processing an image of said region which is equal to or larger than a threshold, and use the dimension $D_{region\_Y}$ to enable generation of said optimized recipe for the examination system, thereby enabling acquisition of the plurality of regions of the specimen by the examination system, and processing of each region of the plurality of regions with a total parallel computation power which is equal to or larger than the threshold.

In accordance with certain aspects of the presently disclosed subject matter, there is provided a computer-implemented method comprising obtaining a dimension $W_{spot}$ of an illumination spot of an examination system, enabling the examination system to acquire, along a scanning direction, slices of a semiconductor specimen comprising a plurality of dies, obtaining data informative of at least one dimension $D_{die\_X}$ of each die of the plurality of dies of the semiconductor specimen, wherein said dimension is defined along a direction orthogonal to the scanning direction, use $W_{spot}$ to determine, along said direction, a dimension $D_{region\_X}$ of each region of a plurality of regions to acquire in the semiconductor specimen, wherein the dimension $D_{region\_X}$ is larger than the dimension $D_{die\_X}$, wherein the dimension $D_{region\_X}$ is selected to enable generation of an optimized recipe, in which acquisition of the plurality of regions by the examination system is associated with a total level of overlap between slices acquired by the examination system which meets an optimization criterion, and using the dimension $D_{region\_X}$ to enable generation of said optimized recipe for the examination system, thereby enabling acquisition of the plurality of regions of the specimen by the examination system.

According to some embodiments, the method can comprise one or more of the features described with respect to the system above.

In accordance with certain aspects of the presently disclosed subject matter, there is provided a method comprising, by a processor and memory circuitry (PMC), obtaining a dimension $W_{spot}$ of an illumination spot of the examination system operative to acquire images of a semiconductor specimen comprising a plurality of dies, wherein the examination system is operative to process an image of a die using a total parallel computation power selected by the examination system, obtaining data informative of at least one dimension $D_{die\_Y}$ of each die of the plurality of dies along a given direction, using $D_{die\_Y}$ and the dimension $W_{spot}$ to determine a dimension $D_{region\_Y}$ of each region of a plurality of regions to acquire in the semiconductor specimen, wherein the dimension $D_{region\_Y}$ is determined along said given direction and is larger than the dimension $D_{die\_Y}$, wherein the dimension $D_{region\_Y}$ is selected to enable generation of an optimized recipe for which each region of the plurality of regions acquired by the examination system is associated with a total parallel computation power used by the examination system for processing an image of said region which is equal to or larger than a threshold, and using the dimension $D_{region\_Y}$ to enable generation of said optimized recipe for the examination system, thereby enabling acquisition of the plurality of regions of the specimen by the examination system, and processing of each region of the plurality of regions with a total parallel computation power which is equal to or larger than the threshold.

According to some embodiments, for a given die, the examination system is operative to process an image of the given die using a total parallel computation power which is selected depending on a dimension of the given die and a dimension of the illumination spot, wherein the method comprises selecting the dimension $D_{region\_Y}$ of each region to cover a number N of dies of the specimen which enables the examination system to process each region with a total parallel computation power which is equal to or larger than the threshold.

According to some embodiments, for a given die, the examination system is operative to process a plurality of pixel blocks covering an image of the given die using a total parallel computation power which is selected depending on a dimension of the die, a dimension of the illumination spot of the examination system, and a dimension of each pixel block, wherein the method comprises selecting, for a given dimension of pixel block which is equal to or larger than a required threshold, the dimension $D_{region\_Y}$ of each region to cover a number N of dies of the specimen which enables the examination system to process, for each given region of the plurality of regions, a plurality of pixel blocks covering the given region, wherein each pixel block is of said given dimension, with a total parallel computation power which is equal to or larger than the threshold.

According to some embodiments, the total parallel computation power used for processing the image of the region meets the threshold when a number of processors of the examination system operating in parallel for processing the image of the region corresponds to a maximal number of processors allowed by the examination system for processing an image of a die.

According to some embodiments, each region covers a first die and a second die, wherein a number of processors of the examination system operating in parallel for processing the image of the region is larger than a number of processors that the examination system would have used in parallel for processing an image of the first die, thereby improving a throughput of the examination system.

According to some embodiments, the method comprises obtaining data informative of at least one dimension $D_{die\_X}$ of each die of the plurality of dies of the semiconductor specimen, wherein said dimension is defined along a direction orthogonal to the given direction, using $W_{spot}$ to determine, along said direction, a dimension $D_{region\_X}$ of each region of a plurality of regions to acquire in the semiconductor specimen, wherein the dimension $D_{region\_X}$ is larger than the dimension $D_{die\_X}$, wherein the dimension $D_{region\_X}$ is selected to enable generation of an optimized recipe in which acquisition of the plurality of regions by the examination system is associated with a total level of overlap between slices acquired by the examination system which meets an optimization criterion, and using the dimension $D_{region\_X}$ to enable generation of said optimized recipe for the examination system, thereby enabling acquisition of the plurality of regions of the specimen by the examination system.

According to some embodiments, the method comprises using a database which stores, for each of a plurality of different values of a dimension of an illumination spot of the examination system, a threshold indicative of a minimal dimension along said given direction of each region of the plurality of regions to acquire in the specimen, said threshold enabling processing of an image of each region by the examination system with a total parallel computation power which is equal to or larger than a threshold.

According to some embodiments, the method comprises obtaining input data $D_{geometrical\_die}$ informative of one or more geometrical properties of elements present in a die of the specimen, and using said data $D_{geometrical\_die}$ to generate data $D_{geometrical\_region}$ informative of one or more geometrical properties of elements present in each region covering at least two dies.

According to some embodiments, each region covers a plurality of dies of the specimen and areas separating dies of said plurality of dies.

According to some embodiments, each region covers a plurality of dies of the specimen and areas separating dies of said plurality of dies, and the method comprises indicating to the examination system a location of the areas separating the dies.

In accordance with certain aspects of the presently disclosed subject matter, there is provided a system comprising a processor and memory circuitry (PMC) configured to obtain a dimension $W_{spot}$ of an illumination spot of the examination system operative to acquire images of a semiconductor specimen comprising a plurality of dies, wherein the examination system is operative to process an image of a die using a total parallel computation power selected by the examination system, obtain data informative of at least one dimension $D_{die\_Y}$ of each die of the plurality of dies along a given direction, use $D_{die\_Y}$ and the dimension $W_{spot}$ to determine a dimension $D_{region\_Y}$ of each region of a plurality of regions to acquire in the semiconductor specimen, wherein the dimension $D_{region\_Y}$ is determined along said given direction and is larger than the dimension $D_{die\_Y}$, wherein the dimension $D_{region\_Y}$ is selected to enable generation of an optimized recipe for which each region of the plurality of regions acquired by the examination system is associated with a total parallel computation power used by the examination system for processing an image of said region which is equal to or larger than a threshold, and use the dimension $D_{region\_Y}$ to enable generation of said optimized recipe for the examination system, thereby enabling acquisition of the plurality of regions of the specimen by the examination system, and process of each region of the plurality of regions with a total parallel computation power which is equal to or larger than the threshold.

According to some embodiments, the system can implement one or more of the features described above with respect to the method.

In accordance with certain aspects of the presently disclosed subject matter, there is provided a non-transitory computer readable medium comprising instructions that, when executed by a processor and memory circuitry (PMC), cause the PMC to perform operations comprising obtaining a dimension $W_{spot}$ of an illumination spot of an examination system, enabling the examination system to acquire, along a scanning direction, slices of a semiconductor specimen comprising a plurality of dies, obtaining data informative of at least one dimension $D_{die\_X}$ of each die of the plurality of dies of the semiconductor specimen, wherein said dimension is defined along a direction orthogonal to the scanning direction, using $W_{spot}$ to determine, along said direction, a dimension $D_{region\_X}$ of each region of a plurality of regions to acquire in the semiconductor specimen, wherein the dimension $D_{region\_X}$ is larger than the dimension $D_{die\_X}$, wherein the dimension $D_{region\_X}$ is selected to enable generation of an optimized recipe in which acquisition of the plurality of regions by the examination system is associated with a total level of overlap between slices acquired by the examination system which meets an optimization criterion, and using the dimension $D_{region\_X}$ to enable generation of said optimized recipe for the examination system, thereby enabling acquisition of the plurality of regions of the specimen by the examination system.

In accordance with certain aspects of the presently disclosed subject matter, there is provided a non-transitory computer readable medium comprising instructions that, when executed by a processor and memory circuitry (PMC), cause the PMC to perform operations comprising obtaining a dimension $W_{spot}$ of an illumination spot of the examination system operative to acquire images of a semiconductor specimen comprising a plurality of dies, wherein the examination system is operative to process an image of a die using a total parallel computation power selected by the examination system, obtaining data informative of at least one dimension $D_{die\_Y}$ of each die of the plurality of dies along a given direction, using $D_{die\_Y}$ and the dimension $W_{spot}$ to determine a dimension $D_{region\_Y}$ of each region of a plurality of regions to acquire in the semiconductor specimen, wherein the dimension $D_{region\_Y}$ is determined along said given direction and is larger than the dimension $D_{die\_Y}$, wherein the dimension $D_{region\_Y}$ is selected to enable generation of an optimized recipe for which each region of the plurality of regions acquired by the examination system is associated with a total parallel computation power used by the examination system for processing an image of said region which is equal to or larger than a threshold, and using the dimension $D_{region\_Y}$ to enable generation of said optimized recipe for the examination system, thereby enabling acquisition of the plurality of regions of the specimen by the examination system, and processing of each region of the plurality of regions with a total parallel computation power which is equal to or larger than the threshold.

In accordance with certain aspects of the presently disclosed subject matter, there is provided a system comprising a processor and memory circuitry (PMC), the PMC being configured to obtain data $D_{region}$ informative of a dimension of each region of a plurality of regions of a semiconductor specimen, wherein each region comprises a plurality of dies of the specimen, obtain data $D_{geometrical\_die}$ informative of one or more geometrical properties of elements present in a die of the plurality of dies, use said data $D_{geometrical\_die}$ to generate data $D_{geometrical\_region}$ informative of one or more geometrical properties of elements present in each region of the plurality of regions, and use $D_{geometrical\_region}$ and $D_{region}$ to generate a recipe enabling an examination system to acquire each region of the plurality of regions.

According to some embodiments, the system is configured to use said data $D_{geometrical\_die}$ to generate data $D_{geometrical\_region}$ informative of one or more geometrical properties of elements present in each region of the plurality of regions, without requiring a user to provide $D_{geometrical\_die}$ for each of the plurality of dies covered by the region.

According to some embodiments, the system is configured to use said data $D_{geometrical\_die}$ to generate data $D_{geometrical\_region}$ informative of one or more geometrical properties of elements present a given region of the plurality of regions, based on data $D_{geometrical\_die}$ provided for a single die of the given region.

According to some embodiments, each region covers a plurality of dies of the specimen and areas separating dies of said plurality of dies.

According to some embodiments, the examination system is operative to perform, after acquisition of a given region of the plurality of regions, a processing of an image of said given region to determine data informative of said given region, wherein the PMC is operative to indicate to the examination system a location of areas separating dies in the given region.

According to some embodiments, the examination system is configured to determine defects or metrology data in portions of the given region which do not corresponding to the areas separating the dies.

According to some embodiments, the region covers a plurality of dies along a first direction and a second direction orthogonal to the first direction.

According to some embodiments, the examination system is operative to determine, for at least one given region covering at least a first die and a second die of the specimen, data $D_{defect\_region}$ informative of the given region in a referential of the given region, wherein the PMC is operative to convert data $D_{defect\_region}$ into first data $D_{defect\_die\_1}$ informative of one or more defects present in the first die expressed in a referential of the first die and second data $D_{defect\_die\_2}$ informative of one or more defects in the second die expressed in a referential of the second die.

In accordance with certain aspects of the presently disclosed subject matter, there is provided a computer-implemented method comprising obtaining data $D_{region}$ informative of a dimension of each region of a plurality of regions of a semiconductor specimen, wherein each region comprises a plurality of dies of the specimen, obtain data $D_{geometrical\_die}$ informative of one or more geometrical properties of elements present in a die of the plurality of dies, using said data $D_{geometrical\_die}$ to generate data $D_{geometrical\_region}$ informative of one or more geometrical properties of elements present in each region of the plurality of regions, and using $D_{geometrical\_region}$ and $D_{region}$ to generate a recipe enabling an examination system to acquire each region of the plurality of regions.

In accordance with certain aspects of the presently disclosed subject matter, there is provided a non-transitory computer readable medium comprising instructions that, when executed by a processor and memory circuitry (PMC), cause the PMC to perform operations as described above with respect to the method.

According to some embodiments, the proposed solution generates an optimized recipe, which improves the throughput of an examination system. According to some embodiments, the proposed solution improves throughput and efficiency of an examination system, while being transparent to the user. According to some embodiments, the proposed solution provides a user interface providing recommendations to the user pertaining to the recipe. According to some embodiments, the proposed solution enables automatically optimizing the recipe of an examination tool, with minimal input of the user. According to some embodiments, the proposed solution enables to automatically duplicate data provided by the user for a single die to larger regions of the specimen, thereby reducing the input required from the user.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1A:
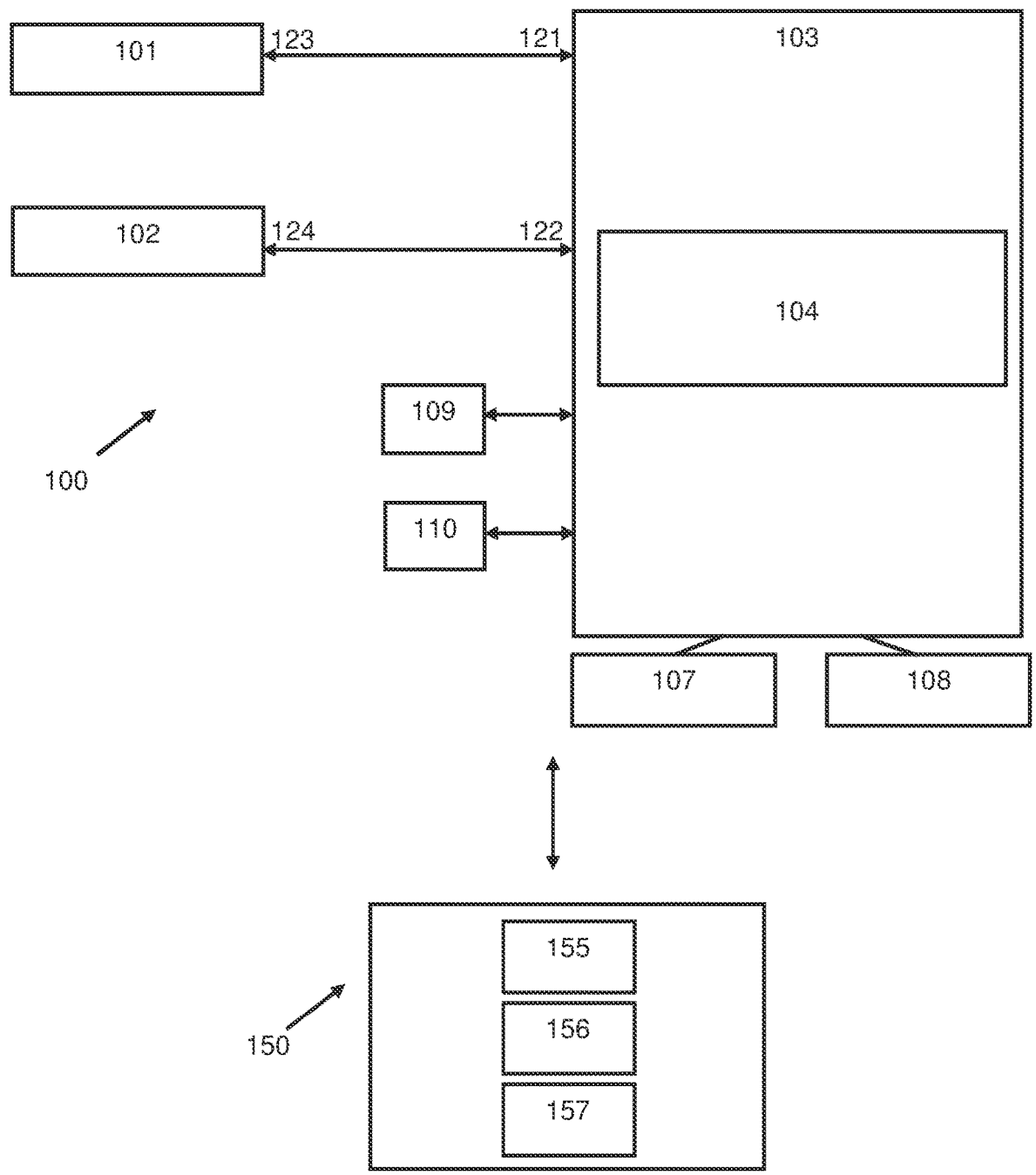
FIG. 1A illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "using", "sending", "determining", "generating", "updating", "enabling", "repeating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities, including, by way of non-limiting example, the system 103 and respective parts thereof disclosed in the present application.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations, as well as operations related to detection and/or classification of defects in a specimen during its fabrication. Examination is provided by using non-destructive examination tools, during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats such as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g., of a wafer and/or parts thereof) as part of the specimen fabrication process. The illustrated examination system 100 comprises computer-based system 103 capable of automatically determining metrology-related information and/or defect-related information using images obtained during specimen fabrication. System 103 can be operatively connected to one or more low-resolution examination tools 101 and/or one or more high-resolution examination tools 102 and/or other examination tools. The examination tools are configured to capture images and/or to review the captured image(s) and/or to enable or provide measurements related to the captured image(s).

System 103 includes a processor and memory circuitry (PMC) 104. PMC 104 is configured to provide all processing necessary for operating the system 103, and, in particular, for processing the images captured by the examination tool(s).

System 103 is configured to receive input data. Input data can include data 121, 123 (and/or derivatives thereof and/or metadata associated therewith) produced by the examination tools and/or data produced and/or stored in one or more data repositories 109 and/or in CAD server 110 and/or another relevant data depository. It is noted that input data can include images (e.g., captured images, images derived from the captured images, simulated images, synthetic images, etc.) and associated numeric data (e.g., metadata, hand-crafted attributes, etc.). It is further noted that image data can include data related to a layer of interest and/or to one or more other layers of the specimen.

By way of non-limiting example, a specimen can be examined by one or more low-resolution examination machines 101 (e.g., an optical inspection system, low-resolution SEM, etc.). The resulting data (low-resolution image data 121), informative of low-resolution images of the specimen, can be transmitted—directly or via one or more intermediate systems—to system 103. Alternatively, or additionally, the specimen can be examined by a high-resolution machine 102 (e.g., a scanning electron microscope (SEM) and/or Atomic Force Microscopy (AFM)). The resulting data (high-resolution image data 122), informative of high-resolution images of the specimen, can be transmitted—directly or via one or more intermediate systems—to system 103.

According to some embodiments, PMC 104 can send instructions to the low-resolution examination machines 101 and/or to the high-resolution machine 102.

It is noted that image data can be received and processed together with metadata (e.g., pixel size, text description of defect type, parameters of image capturing process, etc.) associated therewith.

Upon processing the input data (e.g. low-resolution image data and/or high-resolution image data, optionally together with other data as, for example, design data, synthetic data, etc.), system 103 can send the results (e.g. instruction-related data 123 and/or 124) to any of the examination tool(s), store the results (e.g. defect attributes, defect classification, etc.) in storage system 107, render the results via GUI 108 and/or send them to an external system (e.g. to YMS). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. IMDs (Integrated Device Manufacturers), fabs, fabless semiconductor companies, and OSATs (Outsourced Semiconductor Assembly and Test) use YMSes.

Figure 1B:
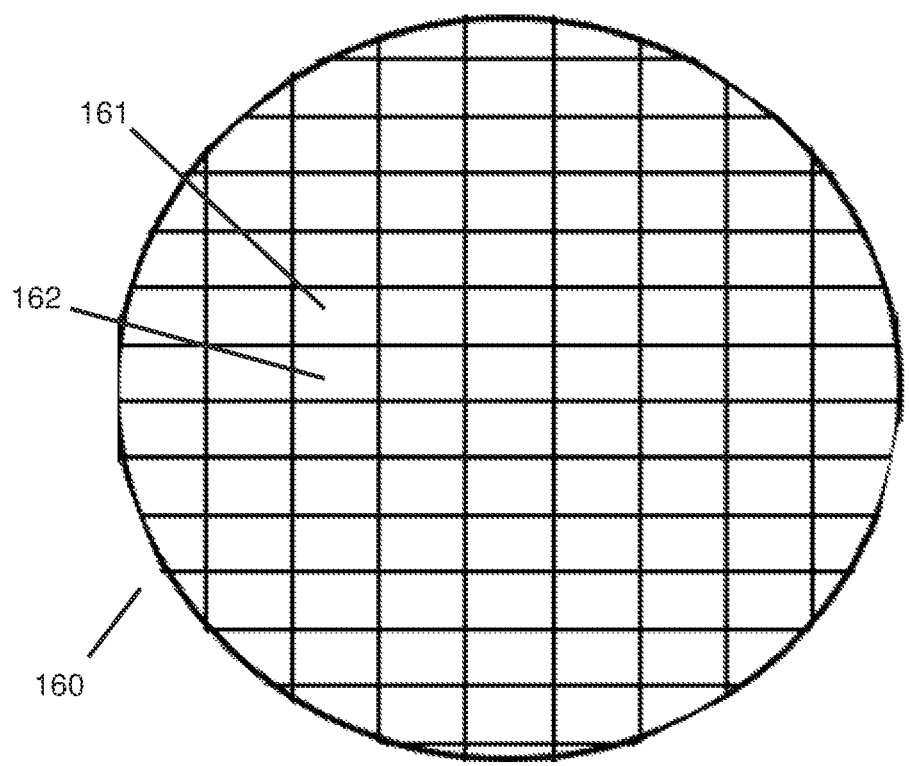
FIG. 1B illustrates an example of a processing which can be performed by the examination system of FIG. 1A.

A non-limitative example of a processing which can be performed by system 103 is depicted in FIG. 1B.

Assume that a specimen 160 includes a plurality of dies (see 161, 162). Once the examination tool has acquired an image of die 161 and an image of die 162, it can be configured to compare the image of die 161 with the image of die 162, in order to detect the presence of possible defects ("die-to-die comparison"). Note that this example of processing is not limitative.

Those versed in the art will readily appreciate that the teachings of the presently disclosed subject matter are not bound by the system illustrated in FIG. 1A; equivalent and/or modified functionality can be consolidated or divided in another manner and can be implemented in any appropriate combination of software with firmware and/or hardware.

As depicted in FIG. 1A, a computer-based system 150 is operative to communicate with the examination system 100. According to some embodiments, system 150 can generate a recipe (optimized recipe), which can be transmitted to the examination system 100, or can send instructions to the examination system 100 which enables the examination system to generate an optimized recipe. This optimized recipe can be used by the examination tool 101 and/or 102 during run-time, in order to perform an acquisition of the specimen under examination.

System 150 includes a processor and memory circuitry (PMC) 155. System 150 can also include a user interface 156. The user interface 156 comprises computer-readable instructions which can be executed by the PMC 155, in order to display, on a display device 157 (e.g., a screen) an interface enabling a user to enter data (such as parameters of the specimen, parameters of the recipe, etc.). As explained hereinafter, the PMC 155 is configured to use the data provided to the system 150 in order to generate, or facilitate generation, of an optimized recipe. This optimized recipe can be used by the examination tool(s) in order to acquire images of the specimen accordingly.

System 150 can be used to perform one or more of the methods described with reference to FIGS. 2A, 3C, 4A, 4D, 5, 6B, 7A, 8 and 11.

Although system 150 is depicted in FIG. 1A as an entity distinct from the examination system 100, in some embodiments, system 150 can be part of the examination system 100. In particular, in some embodiments, system 150 can be implemented using the PMC 104 of the examination system 100.

It is noted that the modules illustrated in FIG. 1A can be implemented in a distributed computing environment, in which the aforementioned functional modules shown in FIG. 1A can be distributed over several local and/or remote devices, and can be linked through a communication network. It is further noted that in other embodiments at least one of examination tool 102, system 107 and/or GUI 108 can be external to the examination system 100 and operate in data communication with system 103.

System 103 can be implemented as stand-alone computer(s) to be used in conjunction with the examination tools. Alternatively, the respective functions of the system can, at least partly, be integrated with one or more examination tools.

Figure 2A:
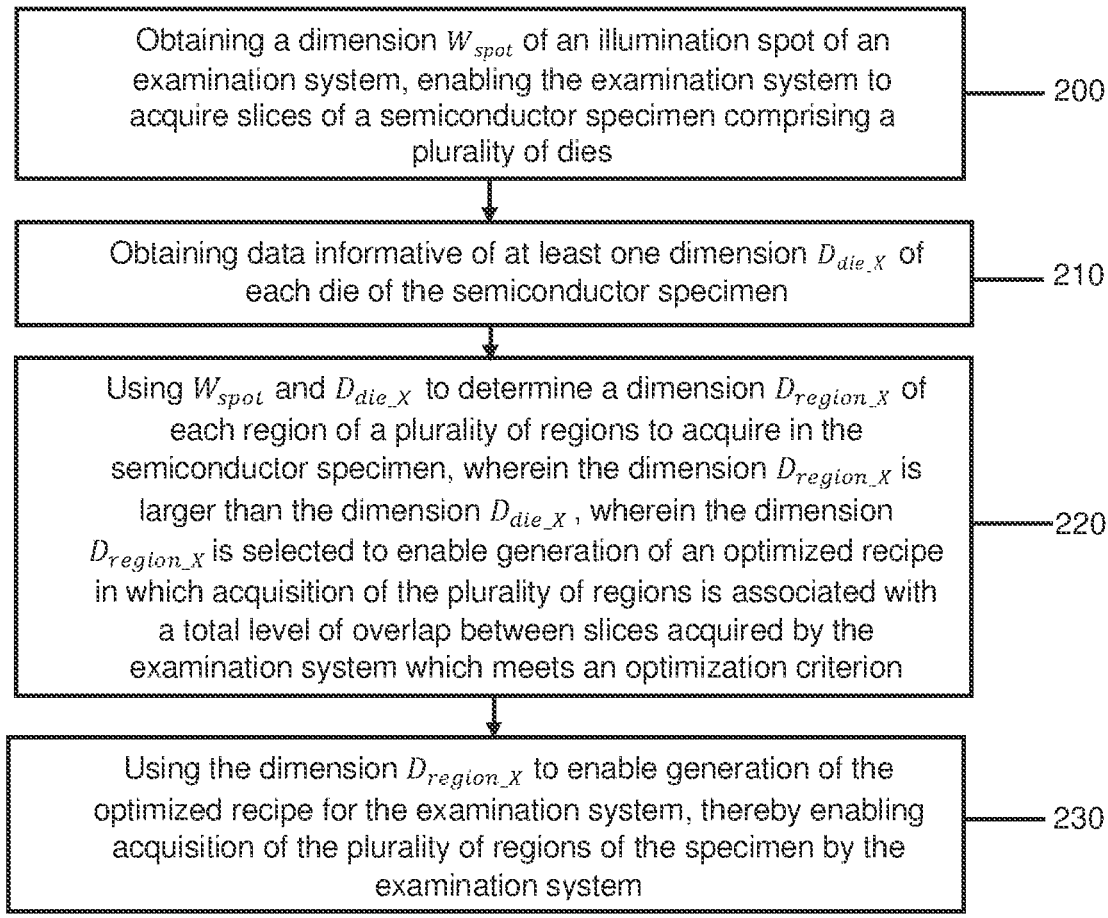
FIG. 2A illustrates a generalized flow-chart of a method of determining regions covering a plurality of dies, for enabling generation of an optimized recipe which enables a total level of overlap of the slices acquired by the examination system to meet an optimization criterion.
Figure 2B:
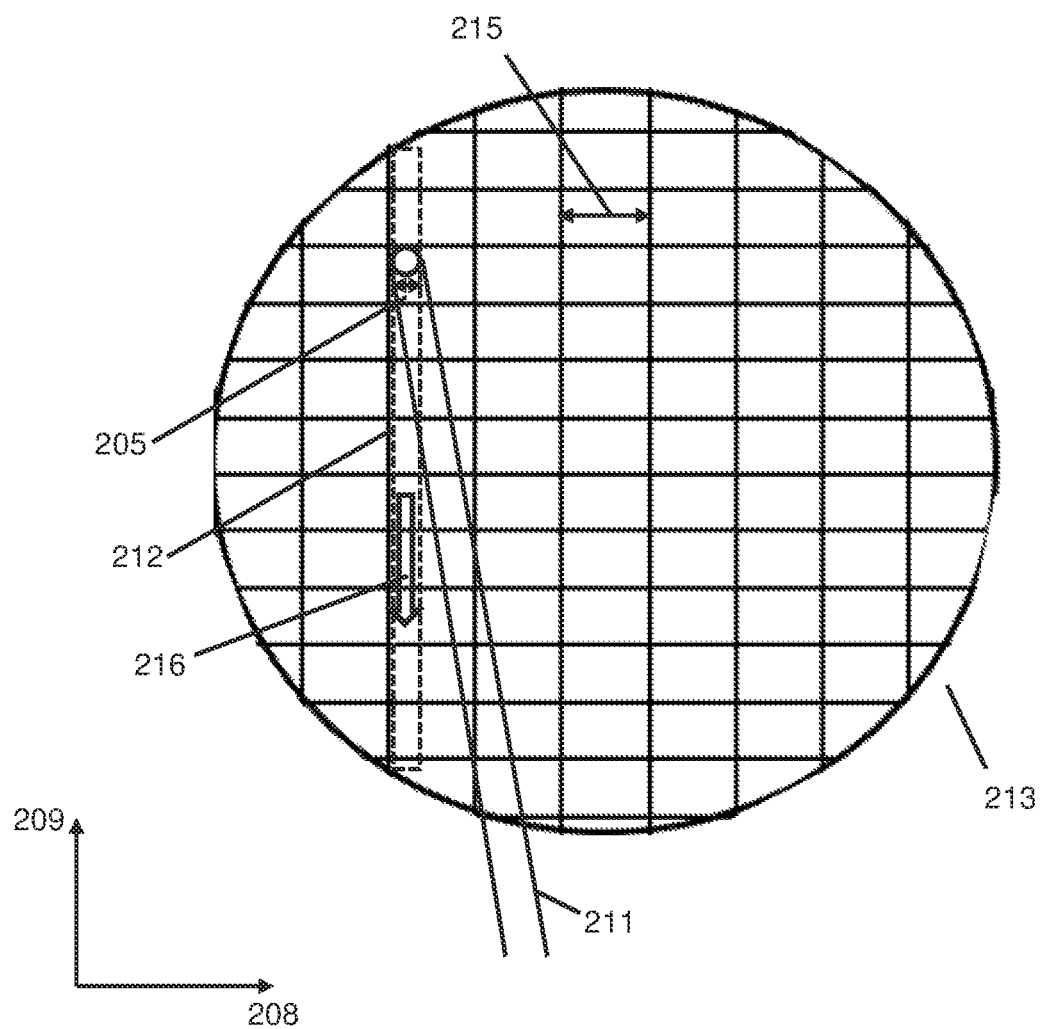
FIG. 2B illustrates an example of a slice acquired by the examination system.
Figure 2C:
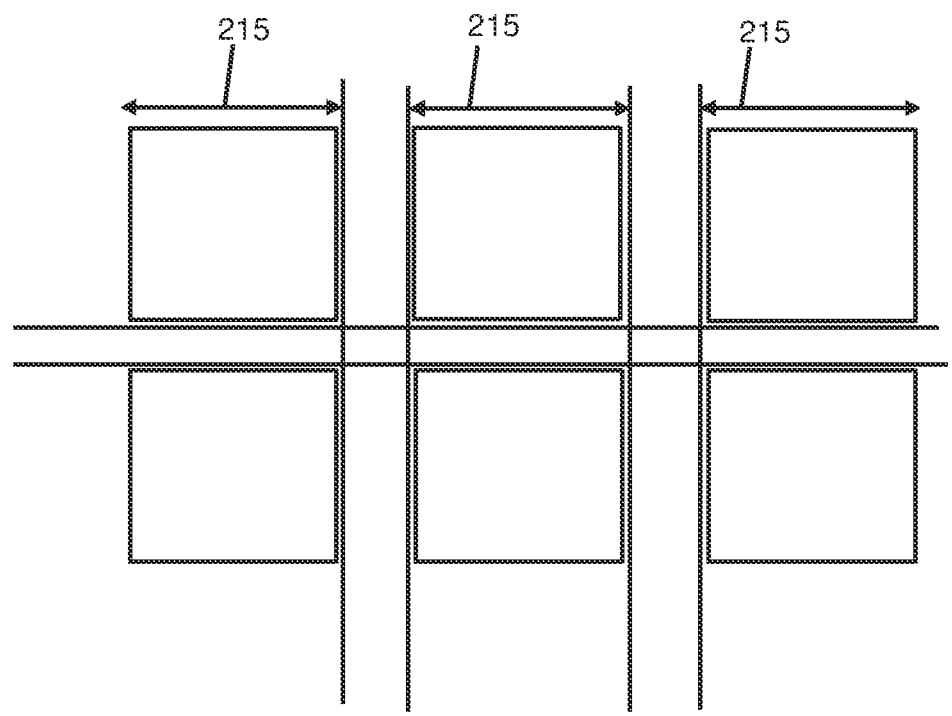
FIG. 2C illustrates an example of a plurality of dies.

Attention is now drawn to FIGS. 2A and 2B.

The method of FIG. 2A includes obtaining (operation 200) a dimension $W_{spot}$ (see reference 205) of an illumination spot 211 of an examination system (see e.g., tools 101 or 102 depicted in FIG. 1A). The dimension $W_{spot}$ can correspond to a dimension of the illumination spot 211 measured when the spot impinges the specimen 213 (the dimension $W_{spot}$ is also called dimension of the field of view). This dimension can be measured for example along the horizontal axis (X axis 208). This is however not limitative. When the examination system moves the illumination spot 211 along a scanning direction (for example, the vertical Y axis 209—note that this is not limitative), this enables the examination tool to acquire a slice 212 of the specimen 213. Repetition of this scan (in a direction 216 going from the upper part of the specimen 213 to the bottom part of the specimen 213, or conversely) enables the examination system to acquire consecutive (adjacent) slices of the specimen 213, one after the other. Note that the size of the slice 212 along the scanning direction (Y axis 209) can be also optimized, and this will be discussed hereinafter. Note that the X axis and the Y axis are defined respectively, for simplicity, as the horizontal axis and the vertical axis of the specimen or of the image, but this is not limitative, and this could be modified (inverted) by rotating the specimen (or the image).

According to some embodiments, $W_{spot}$ is a parameter of the examination system which can be selected depending on the recipe. According to some embodiments, $W_{spot}$ is provided by an operator, using the user interface 156. In other words, the user indicates, for the recipe that has to be generated, which dimension of the illumination spot has to be used. Note that $W_{spot}$ is also designated, in some cases, as the scan magnification or field of view.

Non-limitative examples of values of $W_{spot}$ include: 0.5 mm, 0.7 mm, 0.9 mm, 1.1 mm, etc.

Generally, a semiconductor specimen (wafer) includes a plurality of dies, each including the same elements (repetitive pattern). The method of FIG. 2A further includes obtaining (operation 210) data informative of at least one dimension $D_{die\_X}$ of each die of the semiconductor specimen.

$D_{die\_X}$ (see reference 215) can be, in particular, the dimension of each die along a direction orthogonal to the scanning direction. In a non-limitative example, this dimension corresponds to the X axis 208, which is orthogonal to the Y axis 209 (the Y axis corresponds to the scanning direction, along which the examination system acquires the slices of each die).

According to some embodiments, $D_{die\_X}$ can be provided e.g., by a user, (this information can be obtained from a manufacturer of the specimen, and/or from design data). Generally, all (or at least some of) the dies of the specimen have the same dimension $D_{die\_X}$ along this direction (e.g., X axis 208), and the user can provide this dimension only once for the whole specimen.

Figure 2D:
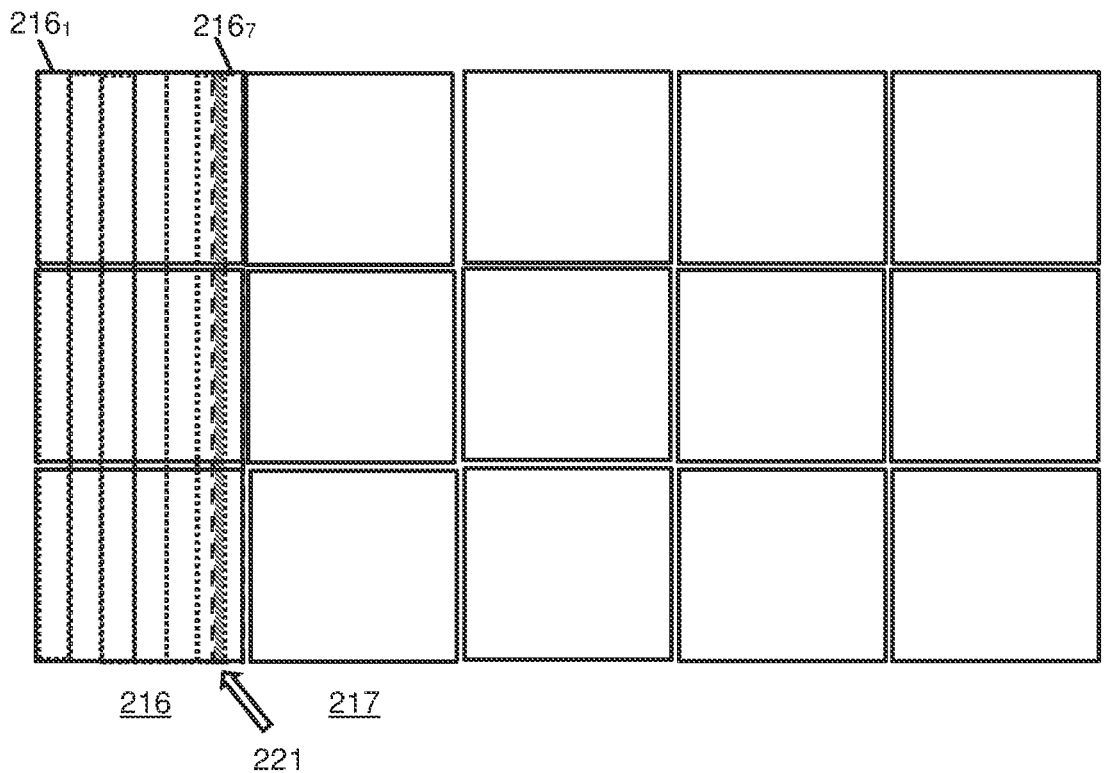
FIG. 2D illustrates an example of a division of a column of dies into a plurality of slices.

In an unoptimized recipe, when the examination system 100 receives the data $D_{die\_X}$, it is configured to determine a set of slices which fully cover this dimension $D_{die\_X}$. This enables the examination system 100, for each die belonging to a given column (or a given row if the scanning direction is along the X axis) of dimension $D_{die\_X}$, to acquire the whole die along the X direction. Note that in the example of FIG. 2D, the examination system acquires slices 2161 to 2167, which fully cover the column 216 of dies along the X direction. Note that the dimension of the slices along the Y axis can be different from what is represented in FIG. 2D.

Figure 2E:
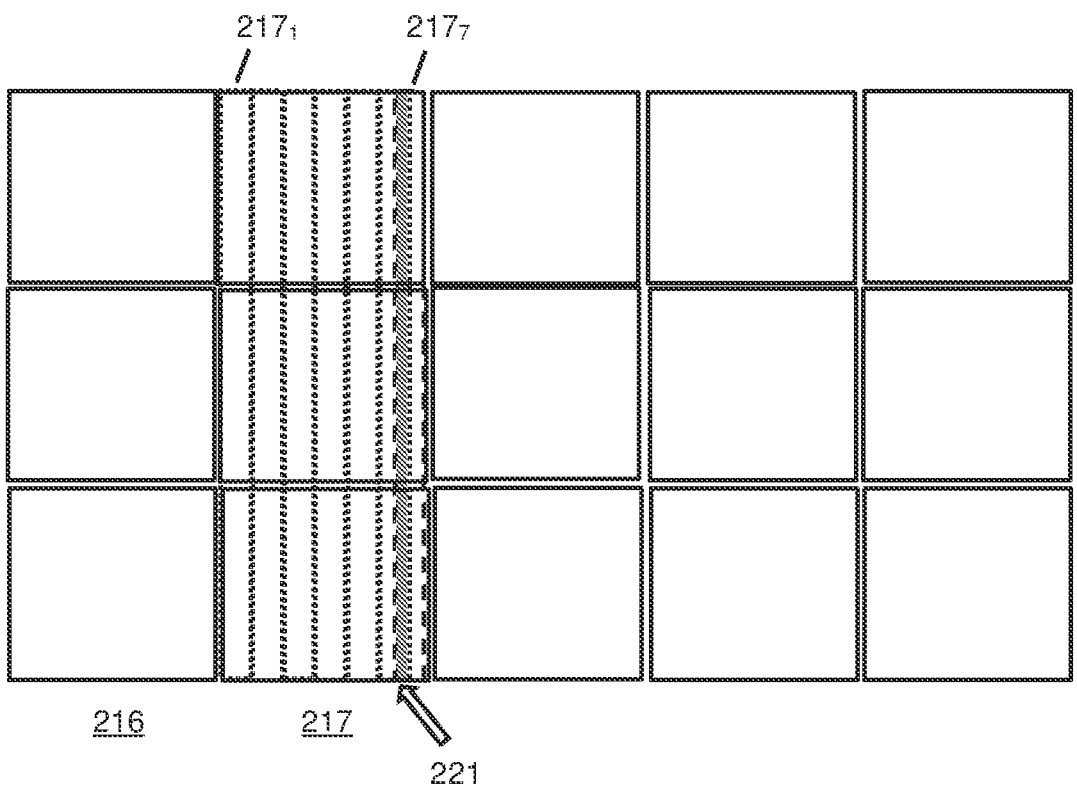
FIG. 2E illustrates an example of an overlap between slices acquired by the examination system.

When the examination system moves to the acquisition of the next column of dies 217, it repeats the same pattern of slices for this column of dies 217 (see FIG. 2E). It therefore acquires slices 2171 to 2177.

Figure 2F:
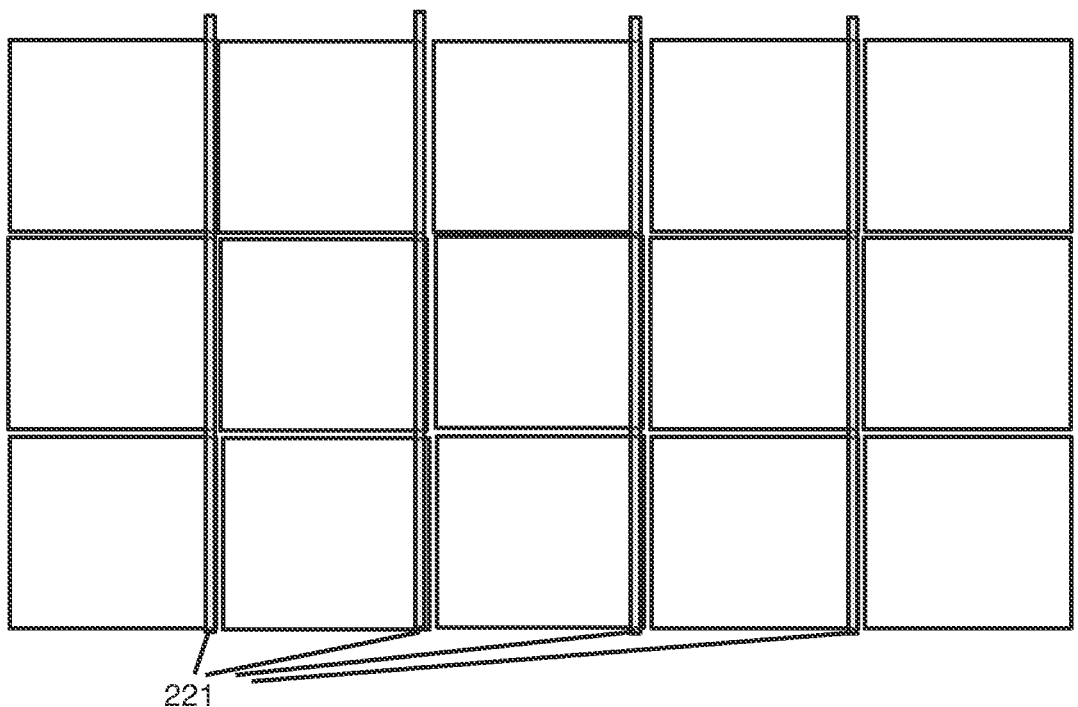
FIG. 2F illustrates an example of a total overlap between slices acquired by the examination system.

As visible in FIGS. 2E and 2F, this unoptimized recipe generates an overlap 221 between the slices. In particular, for each column of dies, there is an overlap between the last slice (2167 or 2177) and the penultimate slice (2166 or 2176). (This overlap has a direct negative effect on the throughput of the examination system during run-time.

Note that the smaller the dimension $D_{die\_X}$, the higher the number of columns of dies present on the specimen. As a consequence, the smaller the dimension $D_{die\_X}$, the higher the total level of overlap of the slices acquired by the examination system. The throughput of the examination system is therefore highly impacted. The total level of overlap can be defined as the total number of instances for which there is an overlap between two different slices (according to some embodiments, the definition of the total level of overlap takes into account the percentage of overlap between the last slice and the penultimate slice). In the example of FIG. 2F, the total level of overlap is four. Alternatively, the total level of overlap can be defined as the total area for which there is an overlap between two different slices.

In the example of FIG. 2F, the total level of overlap corresponds to the total area of the four grey areas 221.

In modern semiconductor specimens, the tendency is to reduce as much as possible the dimension $D_{die\_X}$ (in order to increase the number of dies per specimen). For example, $D_{die\_X}$ can be reduced to a few millimeters, or in some cases, less than one millimeter (these values are not limitative). The impact of the slice overlap on the throughput of the examination system is therefore important.

In order to improve throughput of the examination system, in particular in a configuration in which the dimension $D_{die\_X}$ of each die is small, the method of FIG. 2A proposes to generate an optimized recipe.

The method of FIG. 2A further includes (operation 220) determining a dimension $D_{region\_X}$ of each region of a plurality of regions to acquire in the semiconductor specimen, wherein the dimension $D_{region\_X}$ is larger than the dimension $D_{die\_X}$. Each region has the same dimension $D_{fused\_die\_X}$ (see reference 223 in the non-limitative example of FIG. 2G) which is larger than $D_{die\_X}$. According to some embodiments, each region covers a plurality of N dies along the direction orthogonal to the scanning direction (for example, along the X direction orthogonal to the scanning direction Y), with N an integer which is equal to greater than two. In other words, fusion of a plurality of dies along the X direction has been performed.

The dimension $D_{region\_X}$ is selected to enable generation of an optimized recipe for the examination system, in which acquisition of the plurality of regions is associated with a total level of overlap between slices acquired by the examination system which meets an optimization criterion. In other words, instead of instructing the examination system to acquire successively each column of one or more dies (each column has a dimension $D_{die\_X}$), the optimized recipe instructs the examination system to successively acquire regions of dies, wherein each region covers a plurality of dies and has a dimension $D_{region\_X}$. Specific embodiments for selecting $D_{region\_X}$ will be provided hereinafter.

Figure 2G:
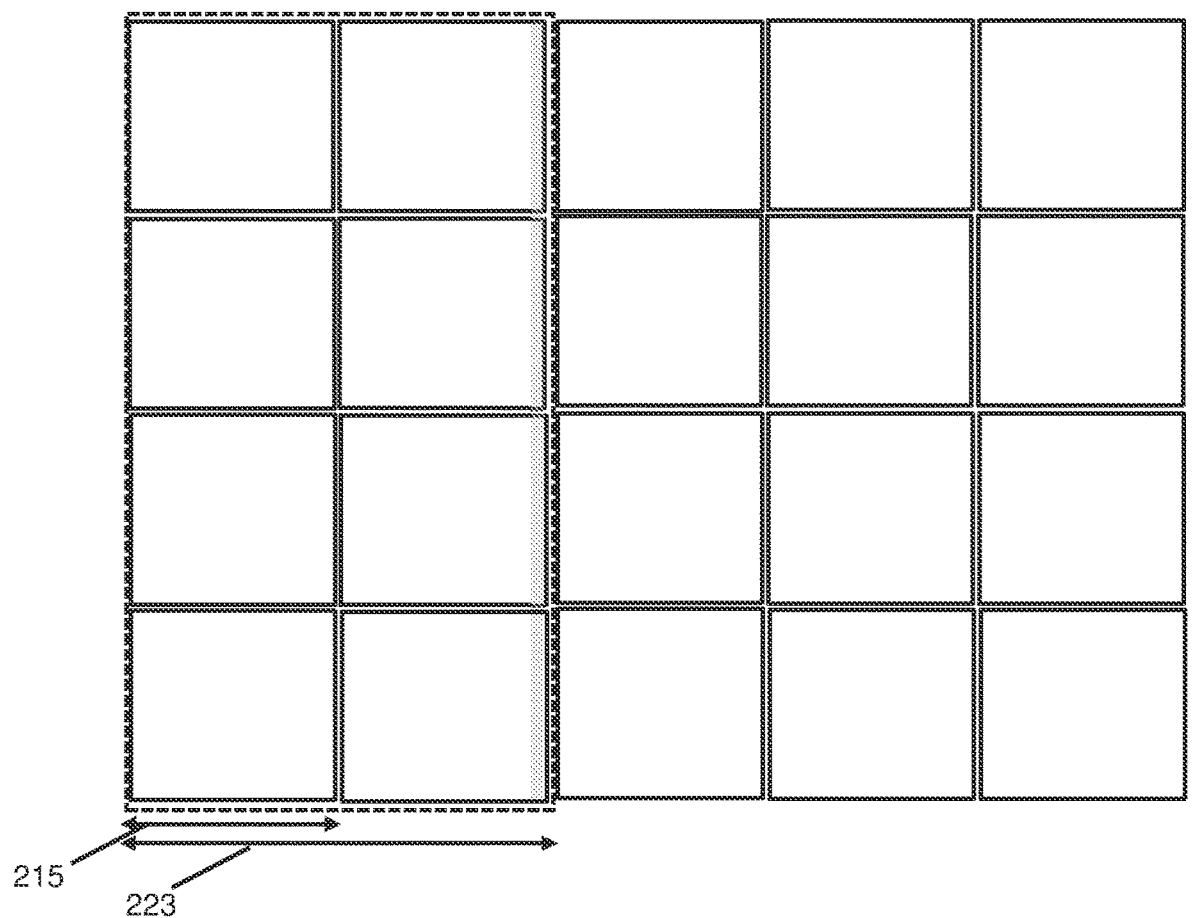
FIG. 2G illustrates an example of a region covering a plurality of dies.

In the example of FIG. 2G, the examination system 100 is instructed to acquire (along the X axis), instead of columns of dies (see reference 215), the plurality of regions (see reference 223 which is an example of a region—in this example each region covers two dies).

In a conventional system, when the examination system 100 receives the dimension $D_{die\_X}$ of each die, it divides each die (or column of dies) into a plurality of $N_1$ slices covering the dimension $D_{die\_X}$ (this division into $N_1$ slices is repeated for each column). This yields a first total level of overlap (a level of overlap can be defined as the total number of instances for which there is a slice overlap, and/or as the total area of the specimen for which there is an overlap of the slices).

In the method of FIG. 2A, the examination system 100 receives (instead of $D_{die\_X}$) the dimension $D_{region\_X}$ of each region. It will therefore divide each region into a plurality of $N_2$ slices covering the dimension $D_{region\_X}$ (this division into $N_2$ slices is repeated for each region). This yields a second total level of overlap, which is smaller than the first level of overlap. The throughput of the examination system is therefore improved in this optimized recipe.

In other words, the method makes the examination system 100 "believe" that each region of dimension $D_{region\_X}$ corresponds to a real die, and therefore, the examination system will divide it into a plurality of slices. By virtue of the selection of the dimension $D_{region\_X}$ as the dimension of the regions to be acquired in the optimized recipe, the total level of overlap of these slices (over the entire specimen, or over the area of the specimen which has to be acquired) will meet the optimization criterion. As a consequence, the total level of slice overlap is reduced.

Figure 2H:
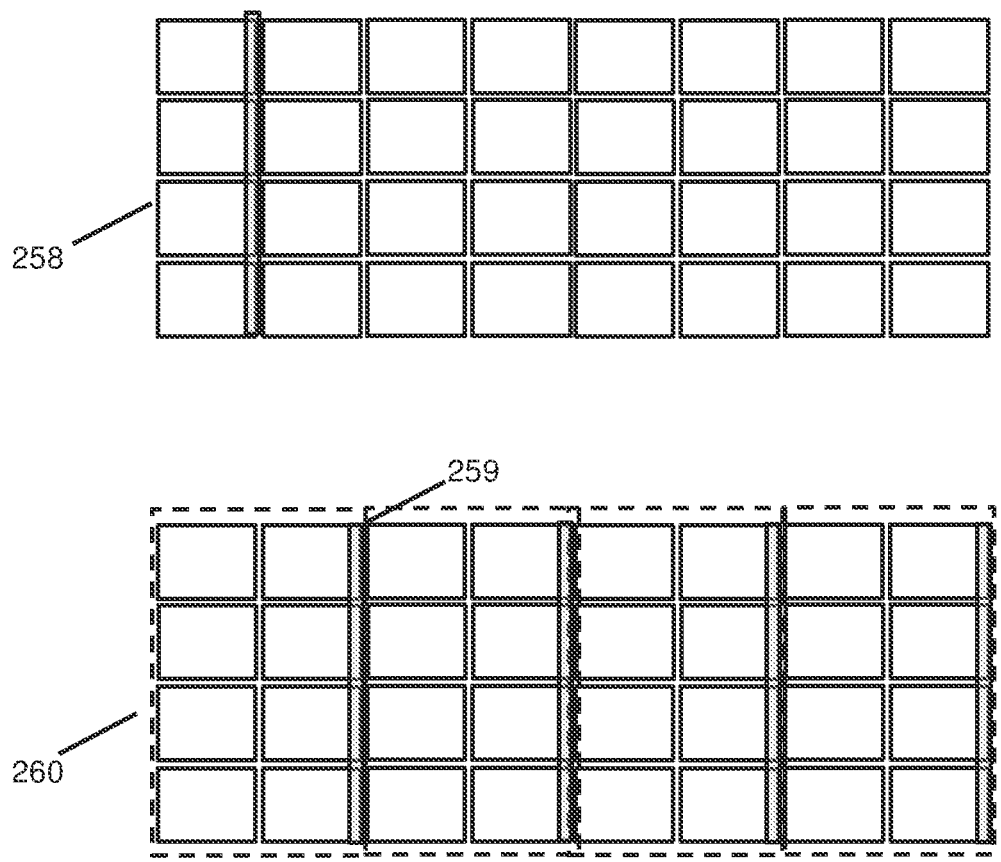
FIG. 2H illustrates a reduction of the total level of slice overlap for regions determined using the method of FIG. 2A.

The schematic representation of FIG. 2H illustrates that the second total level of overlap of the slices (see reference 260) of the optimized recipe (in which the fused regions are divided into slices, instead of dividing the individual dies into slices), is smaller than the first total level of overlap of the slices of the unoptimized recipe (which divides the dimension of each die into slices—see reference 258). Note that the grey areas 259 correspond to the areas of slice overlap in FIG. 2H.

Generally, even when generating the optimized recipe as explained above, an overlap between the slices acquired by the examination system is still present. However, the total level of slice overlap in the optimized recipe is reduced with respect to the total level of slice overlap of an unoptimized recipe. The throughput of the examination system is therefore improved.

According to some embodiments, the optimization criterion takes into account an impact of the total level of overlap of the slices on a throughput of the examination system. For example, it can be defined that the total level of overlap of the slices of the optimized recipe (obtained using the regions of dimension $D_{region\_X}$) meets the optimized criterion when this total level of overlap has an impact on the throughput of the examination tool which is below a threshold (for example 10 percent). In other words, the throughput of the examination system will have a maximal loss of 10 percent (with respect to a "perfect" theoretical scenario in which there is no slice overlap), when the examination system acquires the regions of dimension $D_{region\_X}$.

As mentioned above, the fusion of dies into regions of dimension $D_{region\_X}$ reduces the total level of overlap of the slices (determined over the whole specimen). On the other hand, the use of a large value for the dimension $D_{region\_X}$ can negatively impact the accuracy of defect detection. Therefore, the optimization criterion can take into account this constraint. In particular, in some embodiments, the system is configured to select a dimension $D_{region\_X}$ which both minimizes a number N of dies covered by each region along the direction orthogonal to the scanning direction, while still enabling the total level of overlap of the slices to meet a required impact on a throughput of the examination system. This means that the selection of the dimension of each region will enable the total level of slice overlap to be reduced (in order to reach the desired throughput for the examination system), while minimizing the number of dies covered by each region.

Once the dimension $D_{region\_X}$ of each region of the plurality of regions has been determined, it can be used to enable generation of the optimized recipe (operation 230) for the examination system. In this optimized recipe, the examination system is instructed to acquire the plurality of regions. Operation 230 can therefore include sending a command to the examination system to acquire the plurality of regions (the dimension of each region has been determined as explained above). Note that the division of each region into a plurality of slices can be performed by the examination system 100 itself, which can already implement a computerized function for performing this task for dies of a given dimension along the X axis: in this case, the examination system "believes" that the region of dimension $D_{region\_X}$ is a die of the specimen, and will therefore use the same function to divide the region into slices, but, this time, it will divide the regions into slices instead of dividing the dies into slices. By virtue of the smart selection of the dimension of each region (as explained above), the total level of overlap of the slices acquired by the examination system will meet the optimization criterion.

Figures 3A, 3B:
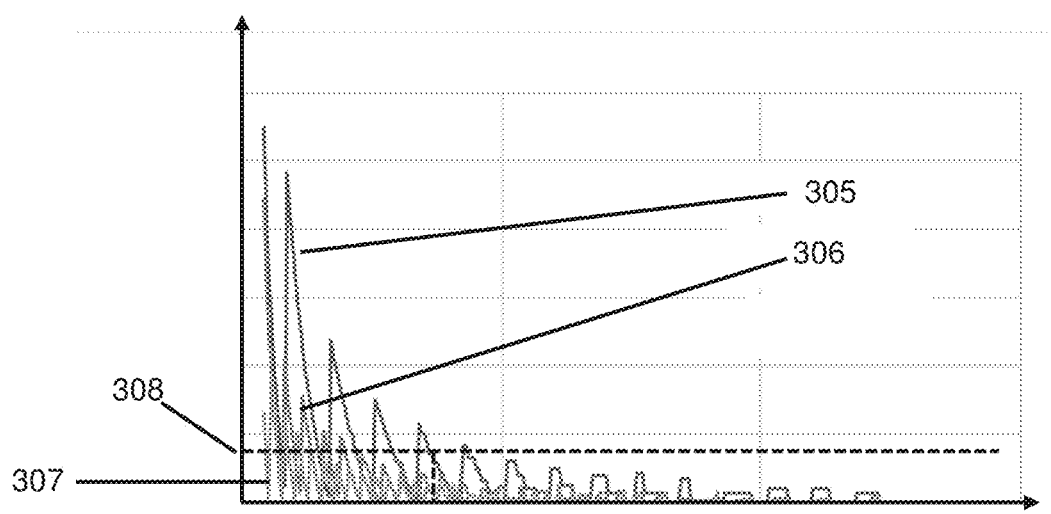
FIG. 3A illustrates an example of a database which can be used to determine the dimension of the regions in the methods of FIG. 2A or 3C.
FIG. 3B illustrates an example of a function linking the dimensions of the regions to an impact of the throughput of the examination system.

Attention is now drawn to FIG. 3A.

As explained with reference to FIG. 2A, the fusion of multiple dies along the direction (e.g., X direction) orthogonal to the scanning direction reduces the total level of overlap of the slices acquired by the examination system, which, in turn, improves the throughput of the examination system.

In some embodiments, a database 300 can be used to perform the method of FIG. 2A. The database 300 can store, for each of a plurality of different values of a dimension of an illumination spot of the examination tool (see column 305), a threshold $D_{region\_X\_threshold}$ indicative of a minimal dimension of each region of the plurality of regions (see column 310), which enables achieving a total level of overlap of the slices which meets the optimization criterion.

In some embodiments, the optimization criterion can define that the total level of overlap of the slices has an impact on the throughput (e.g., average throughput, or maximal throughput) of the examination tool which is below a threshold (for example, 10 percent—this value is not limitative). In this case, the database 300 can store, for each of a plurality of different values of a dimension of an illumination spot of the examination tool (see column 305), a threshold $D_{region\_X\_threshold}$ indicative of a minimal dimension of each region of the plurality of regions in order to have an impact on the throughput of the examination tool which is below the threshold.

Note that the determination of $D_{region\_X\_threshold}$ for each value of the dimension of the illumination spot can be determined using a function (see FIG. 3B). Each function depicts the relationship between the impact on the throughput of the examination system (Y axis), with respect to the dimension of the regions (X axis), for a given dimension of the illumination spot. In the example of FIG. 3B, three functions are depicted (305, 306, 307) for three different values of the dimension of the illumination spot.

Each point $(X_1, Y_1)$ of the function can be calculated using regular geometrical operations, by dividing each region of dimension $X_1$ into a plurality of slices, each with a dimension equal to the dimension of the illumination spot, and calculating the total level of overlap between all slices (for all regions). This total level of overlap can be converted into an impact on the throughput of the examination system, by comparing the total level of overlap to a perfect theoretical case (in which there is no overlap). This comparison provides the impact on the throughput of the examination system (the throughput corresponds to the time required for scanning the full wafer or to the number of wafers which can be scanned per hour). Note that this approach is not limitative and provided as an example only.

For a desired value 308 of the impact of the total level of slice overlap on the throughput, each function can be used to select the corresponding minimal dimension of the region ($D_{region\_X\_threshold}$) which enables this desired value. This desired value can then be stored in the database 300.

Figure 3C:
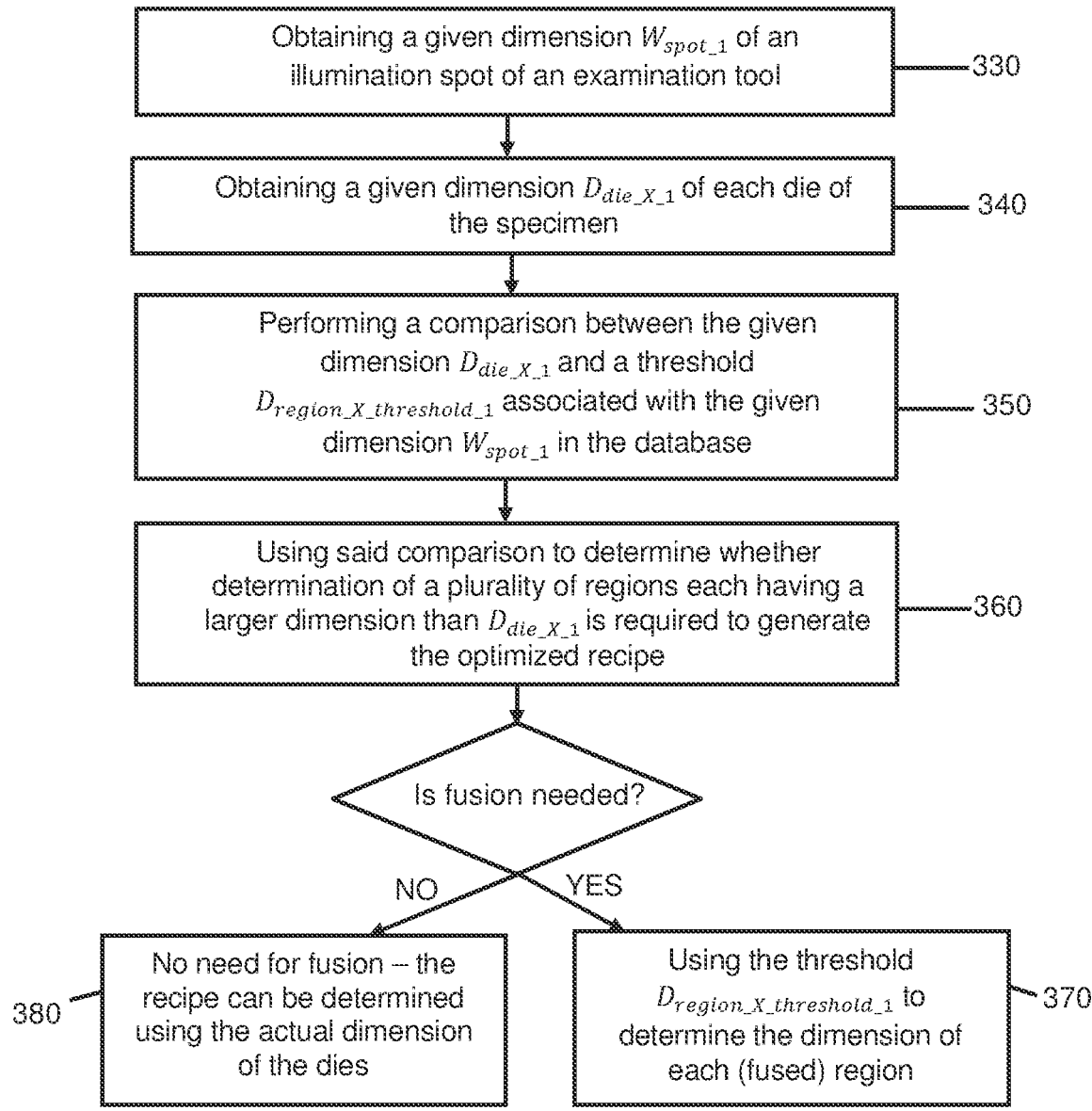
FIG. 3C illustrates a generalized flow-chart of a method of determining regions covering a plurality of dies, for enabling generation of an optimized recipe.

FIG. 3C illustrates a method which uses the database 300.

Assume that it is indicated (e.g., by a user) that the dimension of the illumination spot to be used in the recipe is $W_{spot\_1}$ (operation 330).

Assume that the dimension of each die (along a direction orthogonal to the scanning direction) of the specimen is $D_{die\_X\_1}$ (operation 340).

The method includes (operation 350) performing a comparison between the given dimension $D_{die\_X\_1}$ and a threshold $D_{region\_X\_threshold\_1}$ associated with the given dimension $W_{spot\_1}$ in the database 300.

The method further includes (operation 360) using said comparison to determine whether determination of a plurality of regions each having a larger dimension than $D_{die\_X\_1}$ is required to generate the optimized recipe. In other words, this comparison indicates whether dies have to be fused in the preparation of the optimized recipe, or whether this is not necessary.

If $D_{die\_X\_1}$ is smaller than the threshold $D_{region\_X\_threshold\_1}$, this indicates that fused regions need to be determined, wherein each region has a dimension which is at least equal to $D_{region\_X\_threshold\_1}$ (or larger than $D_{region\_X\_threshold\_1}$). The dimension of each region can be determined using $D_{region\_X\_threshold\_1}$ (operation 370). The dimension of each region is selected to be equal to or larger than $D_{region\_X\_threshold\_1}$. The region can include, in particular, a fusion of a plurality of dies.

Figure 3D:
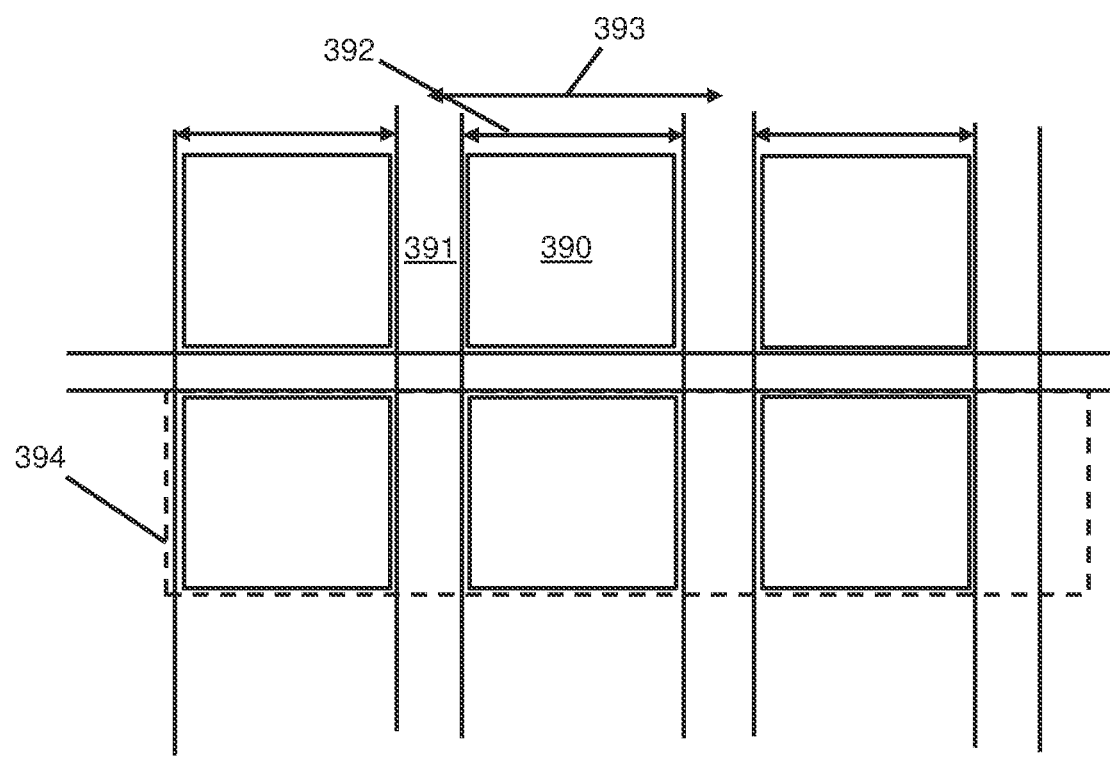
FIG. 3D illustrates an example of a plurality of dies separated by areas (scribe lines).

As visible in FIG. 3D, a die generally includes a central area 390 (which includes various features of interest, such as contacts, gates, etc.) and areas 391 (also called scribe lines or spacing areas) separating the central area from other (neighboring/adjacent) dies. A scribe line (also known as a kerf or frame) is an area in a silicon wafer which is used to separate individual dies at the end of wafer processing. This area also contains features which assist in the manufacturing process but are not present in a final product.

In a regular system, the examination system 100 generally receives two dimensions: the dimension 392 of the central area 390, and the dimension 393 of the die with the central area 390 and the areas (scribe lines) 391 (or the dimension of the scribe lines themselves). The central area with the areas can be designated as an extended die (whereas the die can designate the central area). Note that in some embodiments, the dimension of each extended die is the same along the X axis and along the Y axis (this is not limitative).

According to some embodiments, the dimension of each region can be selected as a multiple of the dimension (along the X direction) of an extended die, in order to exactly cover a number N of extended dies (with N an integer equal to, or greater than two). In this case, the dimension of each region can be selected to meet at least two conditions: (1) being equal to or larger than $D_{region\_X\_threshold\_1}$, (2) exactly covering N dies (or covering exactly N extended dies)—this second condition can be met by selecting the dimension of the region as a multiple of the dimension of a single extended die.

According to some embodiments, a dimension of the regions is selected to ensure that the total level of overlap of the slices meets the optimization criterion (this is ensured by selecting a dimension of the region which is equal to or greater than $D_{region\_X\_threshold\_1}$), while being as small as possible. In particular, a dimension of the regions is selected to ensure that the total level of overlap of the slices meets the optimization criterion, while exactly covering (along the X axis) a number N (an integer) of extended dies which is as minimal as possible. Therefore, operation 370 can include selecting a number N of extended dies (with N an integer equal to or greater than two) for the dimension $D_{region\_X}$ of each region, such that $D_{region\_X}$ is the smallest value which is equal to or larger than the threshold $D_{region\_X\_threshold\_1}$ extracted from the database. In the non-limitative example of FIG. 3D, the region 394 covers three extended dies (N is equal to three).

In a non-limitative example, assume that the user indicates that the recipe has to use an illumination spot with a dimension $W_{spot\_1}$ equal to 1.02 mm and that the dimension $D_{die\_X\_1}$ (see reference 392) of each die is equal to 1.6 mm. The database 300 indicates that for this dimension $W_{spot\_1}$, each region (to be used in the optimized recipe) needs to have a minimal dimension $D_{region\_X\_threshold\_1}$ equal to 2.53 mm, in order to have a total level of slice overlap which meets the optimization criterion. Since the actual dimension of a die (1.6 mm) is smaller than 2.53 mm, the method outputs that fused regions have to be determined. This can be output in the user interface, in order to alert the user that fused regions need to be determined. The dimension of each fused region can be selected to exactly cover a number N (integer) of extended dies, while being as close as possible to the threshold of 2.53 mm. For example, if the dimension of each extended die (dimension of a die with its scribe lines along the X axis) is 1.65 mm (see reference 393), then the method outputs that each region needs to cover two extended dies (since N=2 is the smallest value which ensures that the dimension of the region is both a multiple of 1.65 mm and is larger than the threshold of 2.53 mm).

Once the dimension of the region has been determined, it can be communicated to the examination system. The examination system will automatically divide each region using a pattern (generally identical for each region) of multiple adjacent slices covering the region (the dimension of each slice depends on the dimension of its illumination spot). Generally, the examination system is configured to: (1) acquire a plurality of slices covering a region of the plurality of regions, wherein the plurality of slices is determined based on the dimension $D_{region\_X}$ of the region and based on $W_{spot\_1}$, and (2) repeat (1) until each region of the plurality of regions has been acquired. The method described above ensures that the total of level of overlap of the slices acquired by the examination system will necessarily meet the optimization criterion.

If the comparison of operation 360 indicates that no fusion of dies is needed to generate the recipe (operation 380—this corresponds to a configuration in which the dimension of each die is larger than $D_{region\_X\_threshold\_1}$), the actual dimension of each die (without fusion) can be communicated to the examination system. The optimized recipe therefore relies on the actual dimension of each die. The examination system automatically divides each die into a plurality of slices (along the X direction) to be acquired using its illumination spot, wherein the total level of slice overlap will automatically meet the optimization criterion.

Figure 4A:
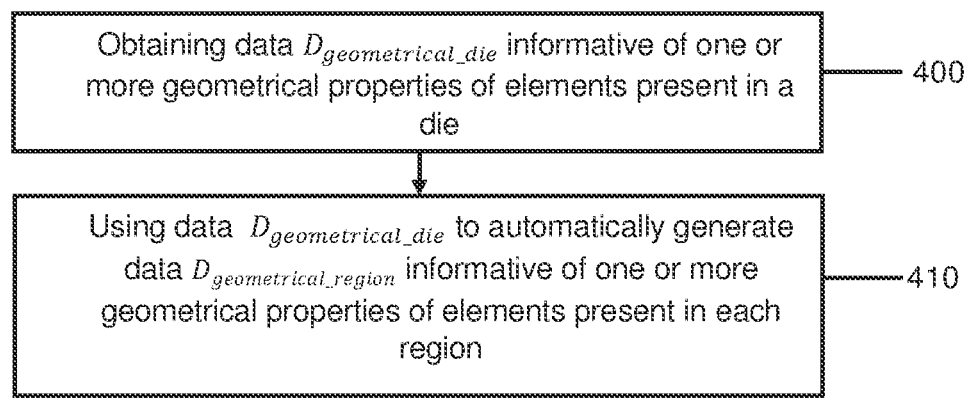
FIG. 4A illustrates a generalized flow-chart of a method of converting geometrical properties expressed with respect to a single die, into geometrical properties expressed with respect to a region covering multiple dies.

Attention is now drawn to FIG. 4A.

The method of FIG. 4A includes obtaining (operation 400) input data $D_{geometrical\_die}$ informative of one or more geometrical properties of elements present in a die.

$D_{geometrical\_die}$ can be provided for example by a user and/or by a system. $D_{geometrical\_die}$ includes, for example, specific elements/features present in a die (position/dimensions of contacts, gates, etc.), level of sensitivity of the examination system required for each sub-area of the die, location of sub-areas of interest in the die, pattern noise layout, hot or cold spots for increased or decreased sensitivity, masked areas from inspection or focus tracking, priority regions for different illumination settings, stiches between different areas of interest on the die, etc.

Figure 4B:
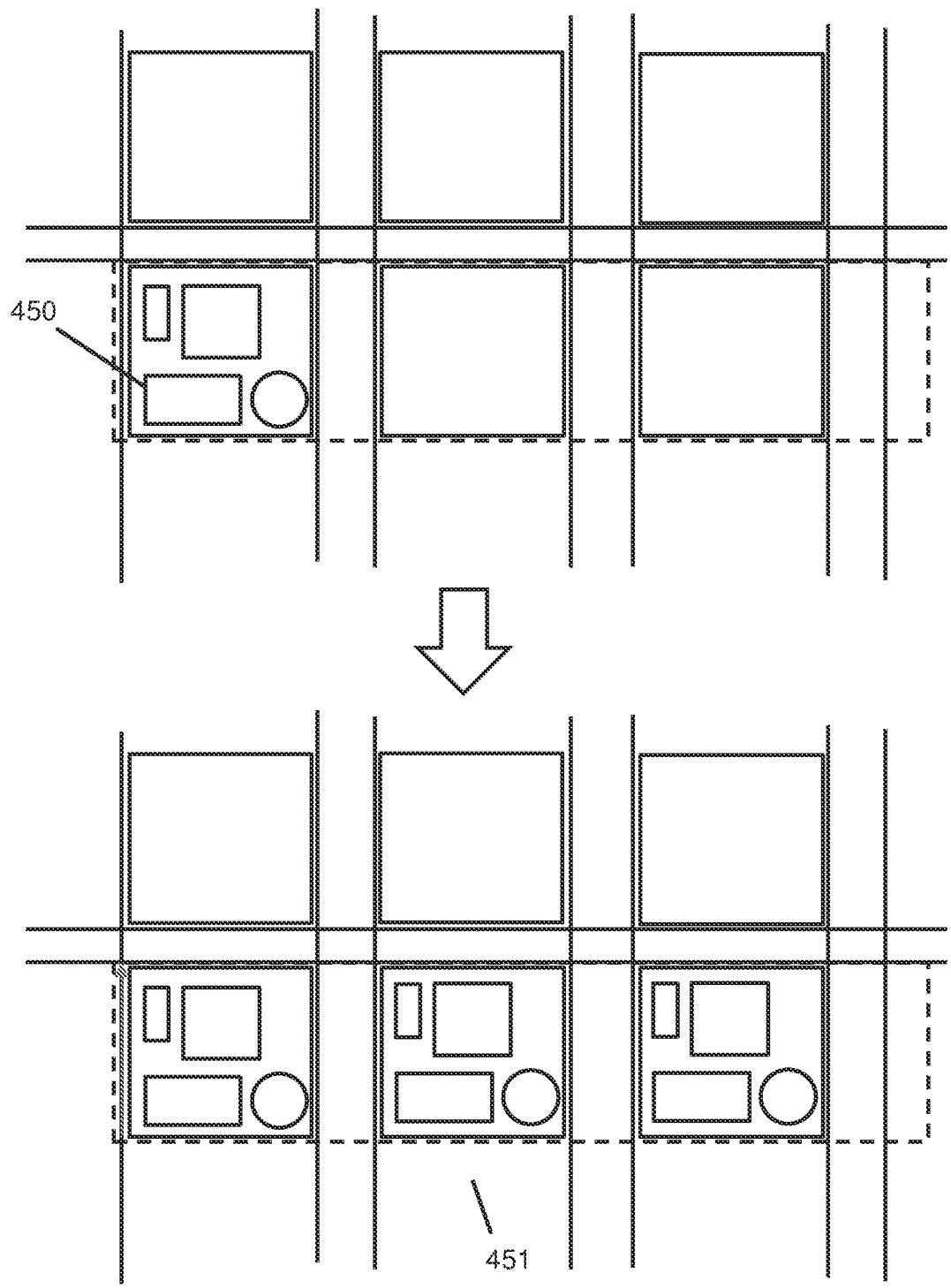
FIGS. 4B and 4C illustrate an example of the method of FIG. 4A.

A non-limitative example of $D_{geometrical\_die}$ (see reference 450) is provided in FIG. 4B. In some embodiments, $D_{geometrical\_die}$ can be drawn by a user, using a dedicated software enabling representation of elements present in a die. This is however not limitative.

As mentioned above, generation of the optimized recipe can include determining regions which each cover more than one die.

However, the user generally defines $D_{geometrical\_die}$ in the referential of a single die, and not in the referential of a region.

Therefore, the method of FIG. 4A can include using (operation 410) data $D_{geometrical\_die}$ to automatically generate data $D_{geometrical\_region}$ (see reference 451) informative of one or more geometrical properties of elements present in each region covering a plurality of dies. In other words, a conversion from the referential of a die into the referential of a region is performed.

Assume for example that each region of the optimized recipe covers N dies. Operation 410 can include automatically duplicating $D_{geometrical\_die}$ (expressed only for one die) into all of the N dies covered by the region (see FIGS. 4B and 4C), in order to obtain $D_{geometrical\_region}$. Note that operation 410 can include converting the coordinates of the elements defined in $D_{geometrical\_die}$ in the referential of a single die, into the referential of the region.

Assume for example that $D_{geometrical\_die}$ is defined in the referential 480 of a die. Assume that for each die (see e.g., first die $482_1$, second die $482_2$ and third die $482_3$), $D_{geometrical\_die}$ stores the coordinates $X_1$, $Y_1$ of a given element $481_1$ expressed in the referential 480 of the die. These coordinates $X_1$, $Y_1$ are the same for this given element in the referential 480 of each die.

Figure 4C:
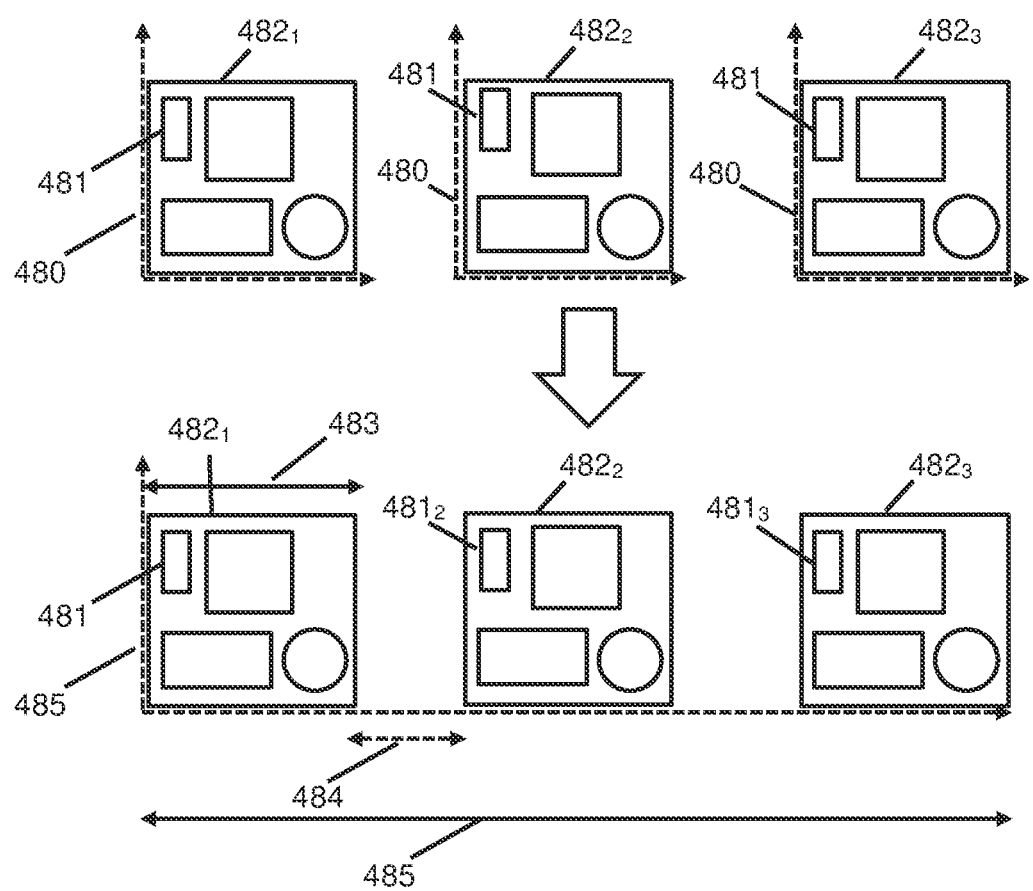

Assume that each region of the optimized recipe covers three dies (as depicted in the lower part of FIG. 4C).

A conversion of $D_{geometrical\_die}$ into $D_{geometrical\_region}$ has to be performed.

Firstly, if $D_{geometrical\_die}$ stores a given element 481 once, then since each region covers a plurality of N dies (in this non-limitative example, N is equal to three), $D_{geometrical\_region}$ has to store this given element N times.

Secondly, the referential 485 of the region is different from the referential 480 of a single die. As a consequence, the coordinates of the given element 481 need to be converted into the new referential 485.

In the example of FIG. 4C, the coordinates of the given element (referred to as $481_2$) of the second die $482_2$ in the new referential 485 are now different from its original coordinates $X_1$, $Y_1$. The same conclusion applies to the given element (referred to as $481_3$) of the third die $482_3$.

This transformation can be performed by using the known dimension 483 of the dies, the known dimension 484 of the scribe lines of the dies, and the known dimension $D_{region\_X}$ (see reference 485) of the region.

Note that each element can be associated with a set of multiple coordinates (which defines e.g., the different extremities of the shape of the element) in $D_{geometrical\_die}$, which can be converted from the referential of a single die, into the referential of the region covering a plurality of dies.

Note that this method of automatic conversion of geometrical properties of elements from the referential of the die, to a referential of a region covering a plurality of dies, can be used in various applications.

In the example above, this method is used in the context of FIG. 2A, in which an automatic fusion of multiple dies is performed, which therefore requires conversion of the geometrical properties from the referential of a single die to the referential of a region. This is however not limitative, and this method can be used in a broad manner in the context of a fusion of multiple dies, even if this fusion is performed manually by a user (a user can decide to fuse N dies based on heuristics or other considerations, in order to generate a recipe for the examination system).

Figure 4D:
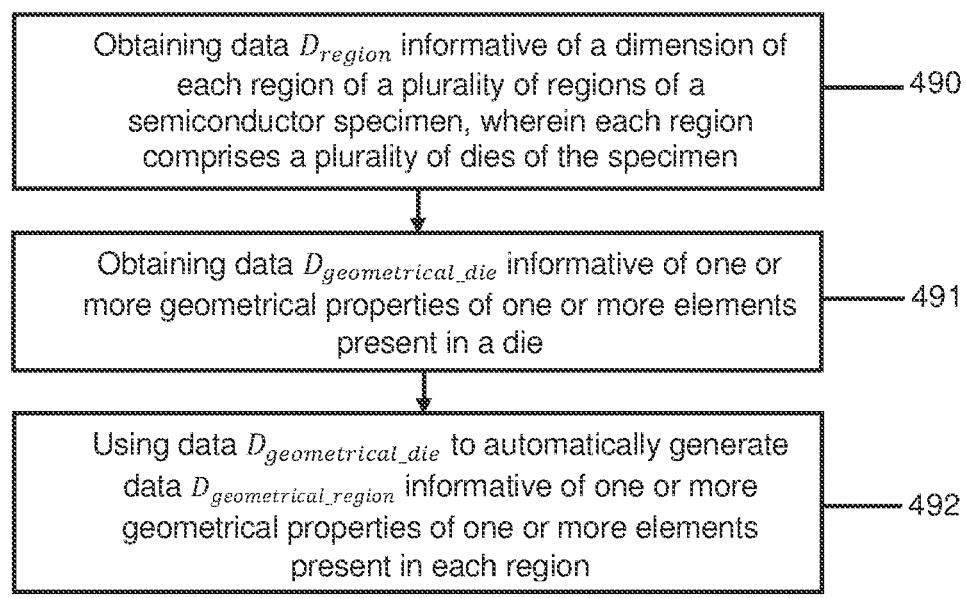
FIG. 4D illustrates a generalized flow-chart of a method of converting geometrical properties expressed with respect to a single die, into geometrical properties expressed with respect to a region covering multiple dies, wherein the region may have been generated using automatic and/or manual fusion of dies.

This is illustrated in FIG. 4D, which includes an operation 490 of obtaining data $D_{region}$ informative of a dimension of each region of a plurality of regions of a semiconductor specimen, wherein each region comprises a plurality of dies of the specimen. Note that the region can cover a plurality of dies along the X axis (orthogonal to the scanning direction) and/or Y axis (along the scanning direction). $D_{region}$ can include the dimension of the region (along the X axis and/or Y axis). As mentioned above, the fusion of a plurality of dies may have been performed (in this embodiment) manually and/or automatically. The method further includes obtaining (operation 490—similar to operation 400) data $D_{geometrical\_die}$ informative of one or more geometrical properties of elements present in a die of the plurality of dies, and using (operation 491—similar to operation 410) said data $D_{geometrical\_die}$ to (automatically) generate data $D_{geometrical\_region}$ informative of one or more geometrical properties of elements present in each region of the plurality of regions. As mentioned above, operation 491 can include (automatically) converting coordinates of one or more elements from a referential of a die to a referential of the region covering a plurality of dies. The method can further include (operation 492) using $D_{geometrical\_region}$ and $D_{region}$ to generate a recipe enabling an examination system to acquire each region of the plurality of regions.

According to some embodiments, the acquisition of the images according to this recipe uses $D_{geometrical\_region}$. Indeed, $D_{geometrical\_region}$ may include parameters defining the acquisition, such as the level of sensitivity to be used for acquiring each element of the region, etc.

According to some embodiments, the acquisition of the images according to this recipe uses $D_{region}$.

According to some embodiments, the processing of the images (e.g., region-to-region comparison) can use $D_{geometrical\_region}$ and/or $D_{region}$.

Figure 5:
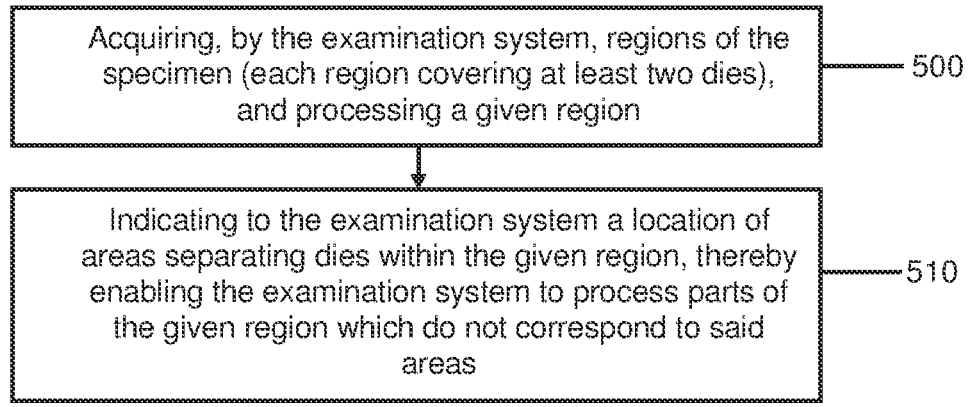
FIG. 5 illustrates a generalized flow-chart of enabling an examination system to ignore certain areas (e.g., separating areas between the dies) in the processing of a region covering a plurality of dies.

Attention is now drawn to FIG. 5.

Once the examination system has acquired a given region, it is operative to process an image of the given region to determine data informative of the given region (operation 500). For example, the examination system can detect defects in the given region, by comparing the image of this given region with an image of another region of the specimen.

As mentioned above, in some embodiments, each region covers at least two dies, and areas (scribe lines) separating the dies. Therefore, when the examination system attempts to detect defects (or to extract relevant data informative of the region), it should not process the part of the image which corresponds to these areas (scribe lines).

The method of FIG. 5 therefore includes indicating (operation 510), to the examination system, a location of the areas between dies within the region. This enables the examination system to process parts of the given region which do not correspond to said areas (the scribe lines are therefore ignored by the examination system when performing the region-to-region comparison, or other relevant processing).

The location of the separating areas (scribe lines) in the referential of each region can be determined using the dimension $D_{region\_X}$ of the region, the dimension $D_{die\_X}$ of the die, and the dimension of the areas (scribe lines).

Note that this method can be also used when a region covers a plurality of dies along the Y axis (see the methods provided hereinafter). In this case, the location of the separating areas in the referential of each region can be determined using the dimension $D_{region\_Y}$ of the region (along the Y axis), the dimension $D_{die\_Y}$ of the die (along the Y axis), and the dimension of the separating areas.

Figure 6A:
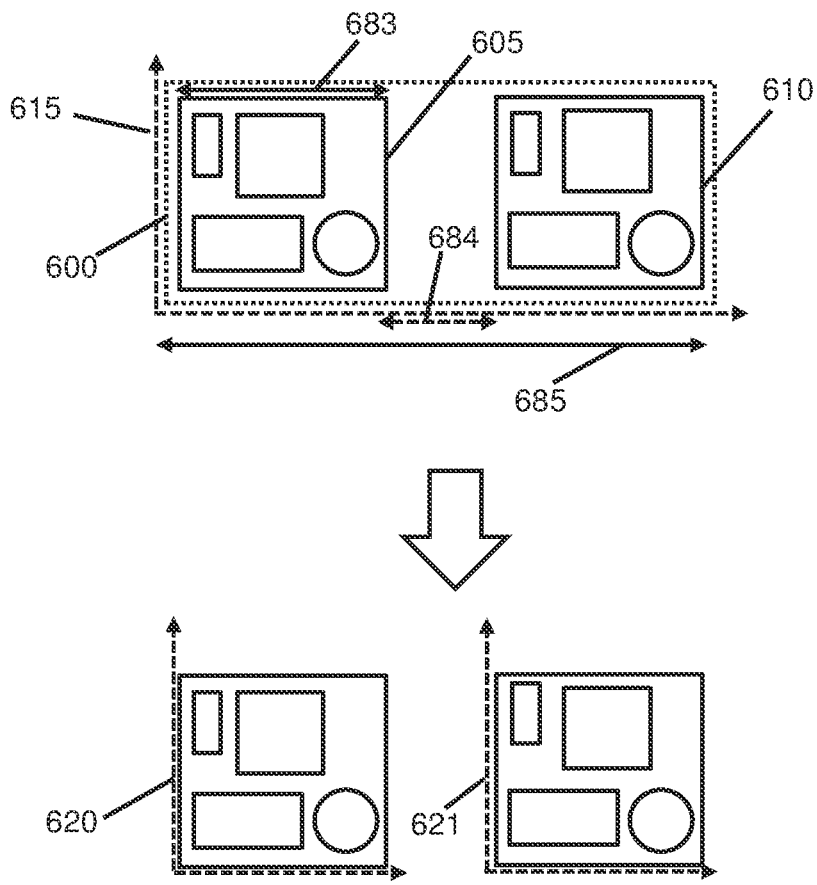
FIG. 6A provides an example of the method of FIG. 6B.
Figure 6B:
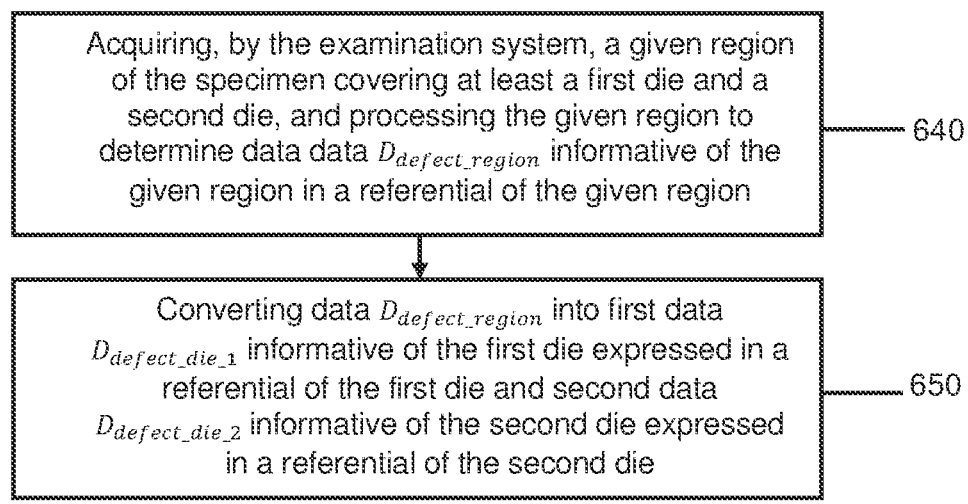
FIG. 6B illustrates a generalized flow-chart of a method of converting data provided by an examination system in the referential of a region covering a plurality of dies into the referential of each die of the region.

Attention is now drawn to FIGS. 6A and 6B.

Assume that a given region 600 covers at least two dies (a first die 605 and a second die 610) and has been acquired by the examination system.

The examination system processes the given region to determine data $D_{defect\_region}$ informative of the given region (operation 640). For example, $D_{defect\_region}$ includes data informative of defects present in the given region.

The data $D_{defect\_region}$ is determined by the examination system in a referential 615 of the given region. For example, the location of a given defect will be expressed in the referential of the region, and not in the referential of the first die 605 or in a referential of the second die 610. This is due to the fact that the examination system "believes" that the region corresponds to a die of the specimen.

The method of FIG. 6B includes converting (operation 650) data $D_{defect\_region}$ into first data $D_{defect\_die\_1}$ informative of the first die 605 expressed in a referential 620 of the first die 605, and second data $D_{defect\_die\_2}$ informative of the second die 610 expressed in a referential 621 of the second die 610.

This transformation can be performed by using the known dimension 683 of the dies, the known dimension 684 of the separating areas of the dies, and the known dimension $D_{region\_X}$ (see reference 685) of the region.

As a consequence, the solution is transparent to the user. The system automatically determines the number of dies covered by each region (to be acquired in the optimized recipe, see FIG. 2A) and returns, after the processing of FIG. 6B, data informative of the region (e.g., defects) in the referential of each die, and not in the referential of the region.

Note that a user interface can be used to enable the user to provide data (such as $W_{spot}$ and $D_{die\_X}$, dimensions of the separating areas of the dies, geometrical properties of elements present in the dies, etc.). The user interface can also be used to output (e.g., display) to the user data of interest, such as the dimension $D_{region\_X}$ selected to generate the optimized recipe, data informative of each die, etc.

Note that this method can be also used when a region covers a plurality of dies along the Y axis (see the methods provided hereinafter). In this case, the transformation between the referential of the region into the referential of each die can use the known dimension of the dies (along the Y axis), the known dimension of the separating areas of the dies, and the known dimension $D_{region\_Y}$ of the region.

Figure 7A:
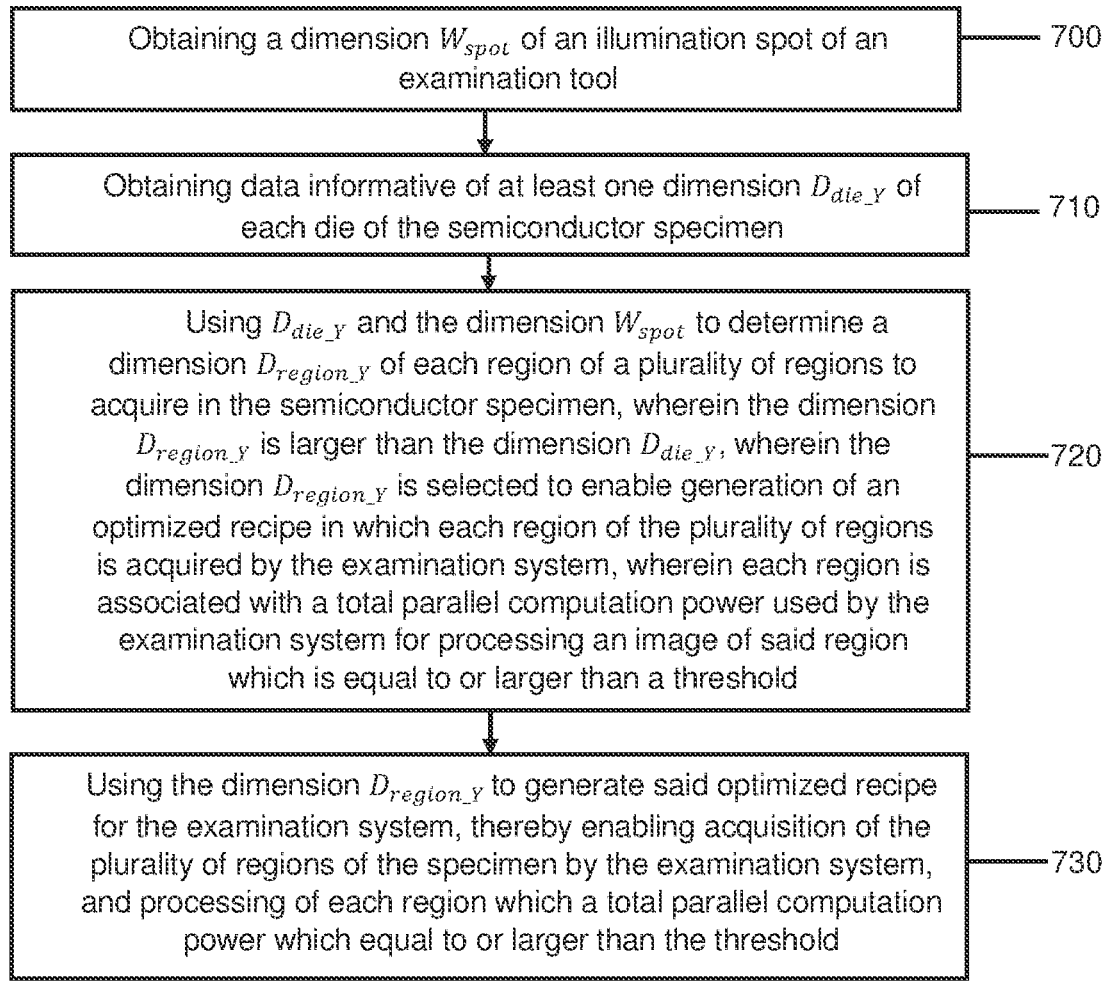
FIG. 7A illustrates a generalized flow-chart of another method of determining regions covering a plurality of dies, for enabling generation of an optimized recipe.
Figure 7B:
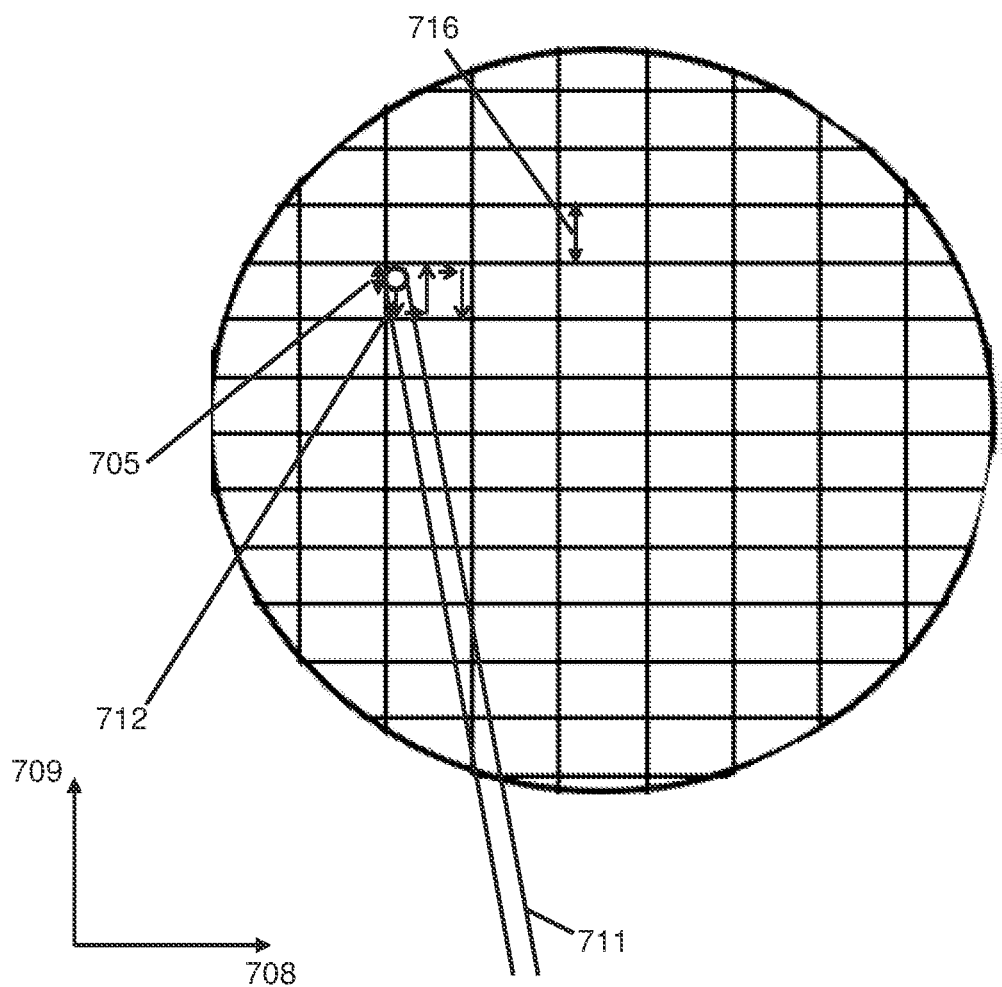
FIG. 7B illustrates an example of an image acquisition by the examination system.

Attention is now drawn to FIG. 7A.

The examination system (see FIG. 1A) is operative to acquire images of a semiconductor specimen comprising a plurality of dies.

Assume that, for each die, the examination system is operative to process an image of the die using a total parallel computation power selected by the examination system. The total parallel computation power is generally selected by the examination system within a predefined range. As explained hereinafter, the examination system can select the total parallel computation power used to process a given image received by the examination system based on different parameters, which are mentioned hereinafter.

The predefined range can be a parameter (e.g., built-in parameter) of the examination system, which can include, in particular, a maximal total parallel computation power allowed by the examination system for processing a given image.

In some embodiments, the total parallel computation power used by the examination system corresponds to a number of processors (also called, in some examples, digital signal processors or DSPs) of the examination system, which can be used in parallel by the examination system for processing a given image of a die.

The maximal total parallel computation power can therefore indicate that the examination system allows, for processing of a given image of a die, up to a maximal number of DSPs used in parallel. A non-limitative example of the maximal number of DSPs allowed by the examination system is 60 DSPs or 80 DSPs. These values are not limitative.

In some embodiments, the examination system can be also associated with a minimal total parallel computation power, under which it is unable (or with a too low accuracy) to process an image of a die. For example, the examination system cannot process an image with a number of processors below a certain value.

The method of FIG. 7A proposes to generate an optimized recipe which forces the examination system to acquire images of regions which each have a dimension for which the examination system will use a total parallel computation power for processing each region which is equal to, or larger than, a threshold. For example, the threshold can correspond to the maximal number of DSPs allowed by the examination system. This optimized recipe therefore improves the throughput of the examination system.

The method of FIG. 7A includes obtaining (operation 700) a dimension $W_{spot}$ (see reference 705) of an illumination spot 711 of the examination system. According to some embodiments, $W_{spot}$ is measured along the scanning direction (see reference 712), which can correspond e.g., to the Y direction (this is not limitative). The Y direction can correspond to the vertical direction (column direction)—this is however not limitative.

The method further includes obtaining (operation 710) data informative of at least one dimension $D_{die\_Y}$ of each die of the plurality of dies of the specimen.

$D_{die\_Y}$ (see reference 716) can be, in particular, the dimension of each die along the scanning direction. In a non-limitative example, this dimension corresponds to the Y axis 709, which is orthogonal to the X axis 708. Generally, all (or at least some of) the dies of the specimen have the same dimension $D_{die\_Y}$ along this direction (e.g., Y axis 709).

According to some embodiments, $D_{die\_Y}$ can be provided e.g., by a user (this information can be obtained from a manufacturer of the specimen, and/or from design data).

The method of FIG. 7A includes (operation 720) using $D_{die\_Y}$ and the dimension $W_{spot}$ to determine a dimension $D_{region\_Y}$ (along the Y direction) of each region of a plurality of regions to acquire in the semiconductor specimen, wherein the dimension $D_{region\_Y}$ is larger than the dimension $D_{die\_Y}$. In some embodiments, $D_{region\_Y}$ enables each region to cover N dies, with N an integer which is equal to or greater than two.

The dimension $D_{fused\_die\_Y}$ is selected to enable generation of an optimized recipe instructing the examination system to acquire each region of the plurality of regions. By virtue of the particular dimension of each region in this optimized recipe, each region is associated with a total parallel computation power used by the examination system for processing an image of said region which is equal to or larger than a threshold (the threshold can be defined e.g., by a user, or can be a predefined constraint).

Assume, for example, that for the dimension $D_{die\_Y}$, and for a given dimension of the illumination spot, the examination system is configured to use 30 DSPs in order to process the image of the die with this dimension $D_{die\_Y}$. Assume that the maximal number of DSPs allowed by the examination system for processing an image of a die is 80 DSPs. Operation 720 enables determining a region (see 725 in FIG. 7C) of larger dimension than the dimension 716 of a single die, which, in turn, forces the examination system to use, in parallel, a higher number of DSPs (in particular the maximal number of DSPs) to process the image of the region. There is therefore a clear gain in terms of throughput. In an unoptimized recipe, the examination system would have acquired a first die 726 and use 30 DSPs in parallel to process this first die, and then it would have acquired a second die 727 and use 30 DSPs in parallel to process this second die. In the optimized recipe, the examination system acquires a region 725 covering the first die 726 and the second die 727 and processes the region using 70 DSPs in parallel. The time required for processing the region 725 is therefore shorter than the time required for processing the first die 726 and then the second die 727 (since more DSPs operate in parallel).

In some embodiments, the dimension $D_{fused\_die\_Y}$ is selected to enable generation of an optimized recipe for which processing of an image of each region is associated with the maximal total parallel computation power $DSP_{max}$ allowed by the examination system for processing an image of a given die.

In other words, the method makes the examination system 100 "believe" that each region of dimension $D_{region\_Y}$ corresponds to a real die of larger dimension than the actual dimension of a single die, for which the examination system will use the maximal total parallel computation power for processing this region (since the examination system believes that this region corresponds to a bigger die).

The method of FIG. 7A further includes (operation 730) using the dimension $D_{region\_Y}$ to enable generation of the optimized recipe for the examination system, thereby enabling acquisition of the plurality of regions of the specimen by the examination system, and processing of each region using a total parallel computation power which is equal to or larger than the threshold.

In particular, operation 730 can include instructing the examination system to acquire the plurality of regions (and to process each region of the plurality of regions—in some embodiments, the examination system performs this processing automatically, without requiring an explicit command). In light of the dimension of each region, the examination system will automatically choose a high total parallel computation power, which is equal to or larger than the threshold (see below explanations relative to Equation 1, which indicate that the total parallel computation power depends on the dimension of the region which has been acquired). The throughput of the examination system is therefore improved.

According to some embodiments, the examination system is operative to process an image of a die using a total parallel computation power which is selected depending on a dimension of the die and a dimension of the illumination spot of the examination system. In some embodiments, this selection relies on the following relationship (note that this relationship is not limitative):

$$N_{DSP} = \frac{D_{die\_Y}}{K * \text{Pixel\_size}} \quad \text{Equation 1}$$

$$W_{spot} = C * \text{Pixel\_size}$$

In Equation 1, $N_{DSP}$ is the total parallel computation power used by the examination system (number of DSPs). $D_{die\_Y}$ is the dimension of each die expressed in mm. It can be measured along the scanning direction. In a non-limitative example, this dimension corresponds to the Y axis 709, which is orthogonal to the X axis 708. K can be a constant number (predefined parameter), without unity. An example of this number is provided hereinafter (see Equation 2). $W_{spot}$ is a dimension of the illumination spot of the examination system (expressed in mm). Pixel size is the size of a pixel (expressed in nm) obtained with this illumination spot (the illumination spot covers a plurality of pixels). "C" is a constant which enables converting the pixel size (in nm) into the dimension $W_{spot}$ of the illumination spot (expressed in mm). This constant depends on parameters of the examination system, such as the number of detectors of the examination system, etc. This constant is known for each examination system.

Based on this equation, a database can be generated, which stores, for each value of $W_{spot}$, data informative of a dimension $D_{fused\_die\_Y}$ of the region which enables the examination system to use a total parallel computation power which meets the required threshold.

Figures 7C, 7D:
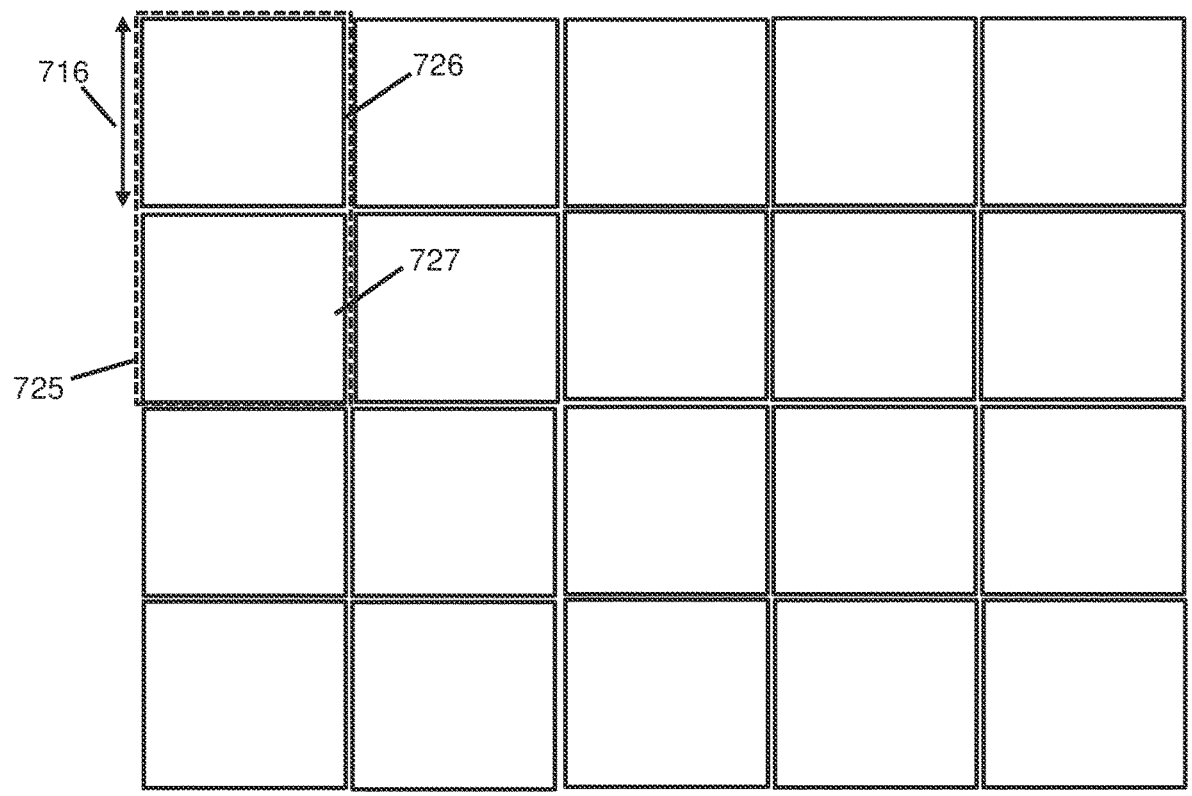
FIG. 7C illustrates an example of a region covering a plurality of dies, obtained using the method of FIG. 7A.
FIG. 7D illustrates an example of a database which can be used to determine the dimension of the regions in the methods of FIG. 7A or 8.

A non-limitative example of this database 750 is provided in FIG. 7D. The database 750 stores, for each different value 751 of $W_{spot}$, the minimal dimension 752 (along the axis Y—e.g. the scanning direction) of the region which enables the examination system to use a total parallel computation power for processing an image of the region which meets the required threshold (for example, the required threshold can correspond to the maximal number of DSPs allowed by the examination system, which is equal to 60, and is a non-limitative example). Note that the values of the database 750 of FIG. 7D are not limitative.

Figure 8:
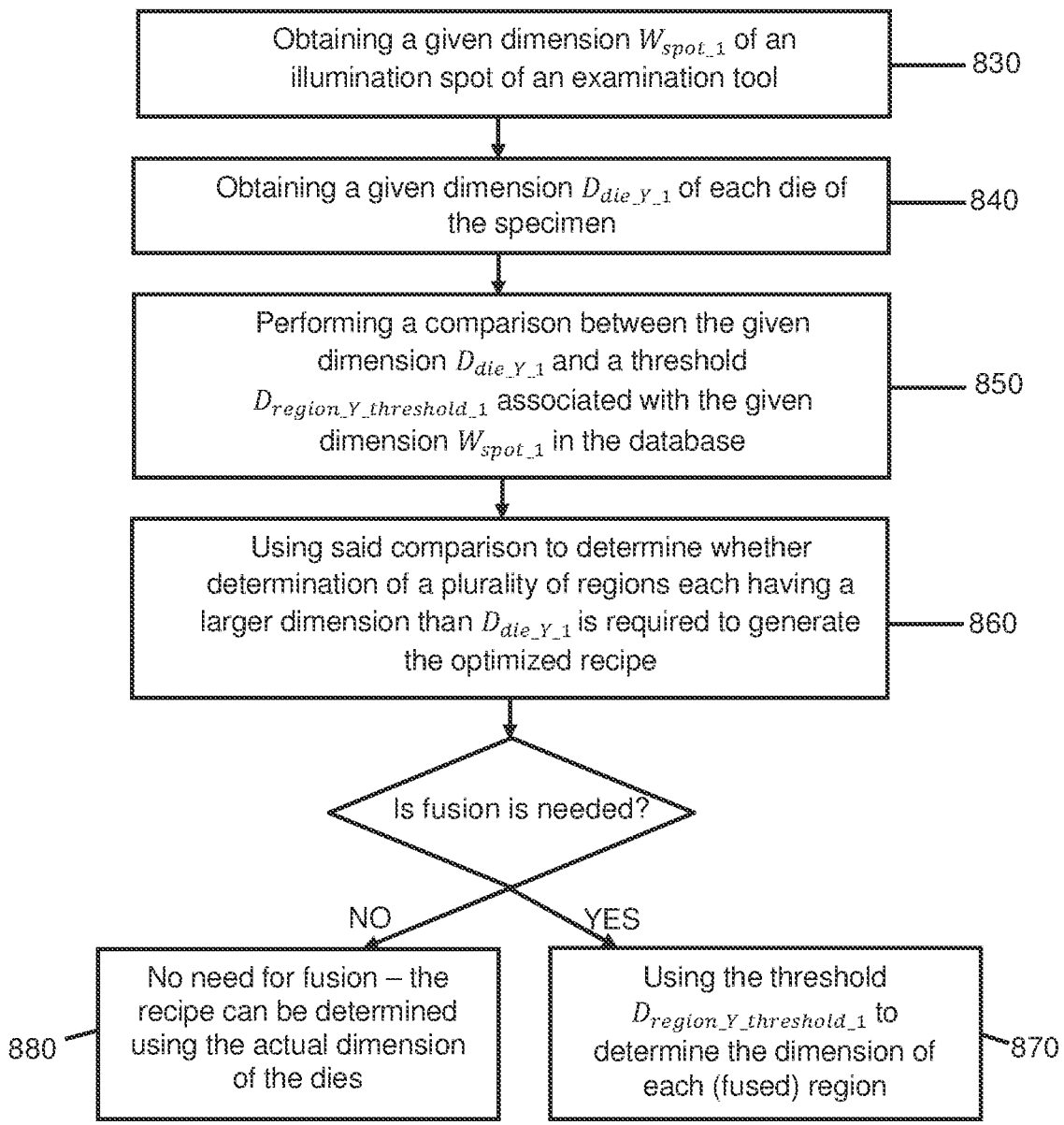
FIG. 8 illustrates a generalized flow-chart of a method of determining regions covering a plurality of dies, for enabling generation of an optimized recipe.

FIG. 8 illustrates a method which can use the database 750.

Assume that it is indicated (e.g., by a user) that the dimension of the illumination spot to be used in the recipe is $W_{spot\_1}$ (operation 830).

Assume that the dimension of each die (along a direction parallel to the scanning direction—e.g., Y direction, which corresponds to the column) of the specimen is $D_{die\_Y\_1}$ (operation 840).

The method includes (operation 850) performing a comparison between the given dimension $D_{die\_Y\_1}$ and a threshold $D_{region\_Y\_threshold\_1}$ (see column 752 in the database 750) associated with the given dimension $W_{spot\_1}$ (see column 751 in the database 750) in the database 750.

The method further includes (operation 860) using said comparison to determine whether determination of a plurality of regions each having a larger dimension than $D_{die\_Y\_1}$ is required to generate the optimized recipe. In other words, this comparison indicates whether dies have to be fused in the preparation of the optimized recipe (along the Y axis), or whether this is not necessary.

If $D_{die\_Y\_1}$ is smaller than the threshold $D_{region\_Y\_threshold\_1}$, this indicates that fused regions need to be determined, wherein each region has a dimension (along the Y axis) which is at least equal to $D_{region\_Y\_threshold\_1}$. The dimension of each region can be determined using $D_{region\_Y\_threshold\_1}$ (operation 870). The dimension of each region is selected to be equal to or greater than $D_{region\_Y\_threshold\_1}$. The region can include, in particular, a fusion of a plurality of dies along the Y axis.

Figure 9:
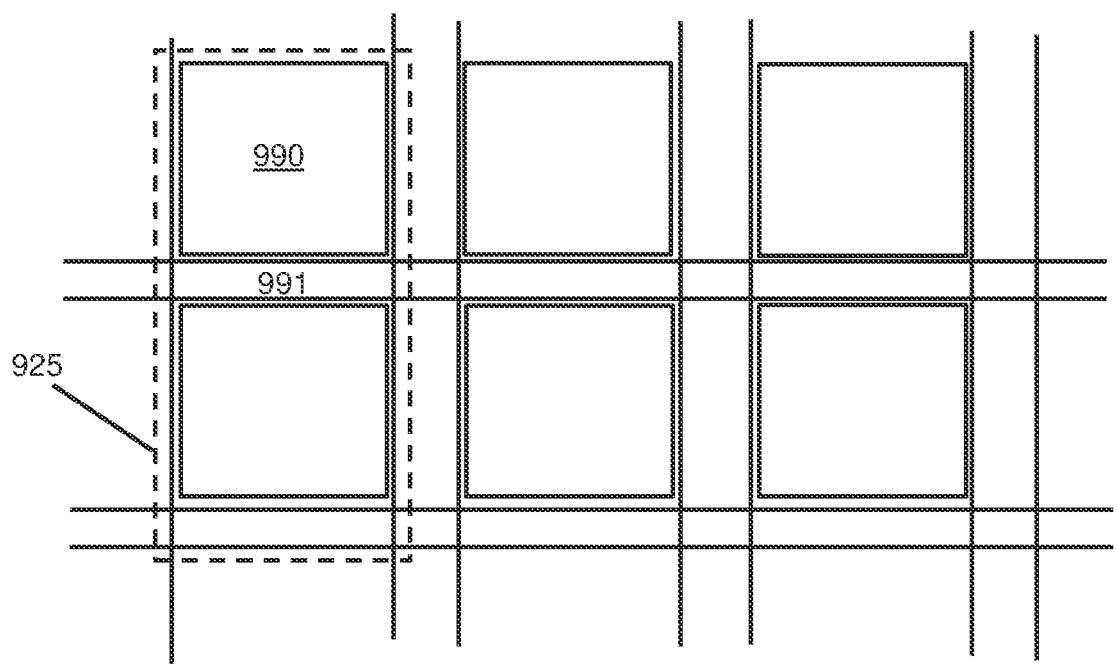
FIG. 9 illustrates an example of a region covering a plurality of dies and areas separating between the dies, obtained using the method of FIG. 7A.
Figure 10:
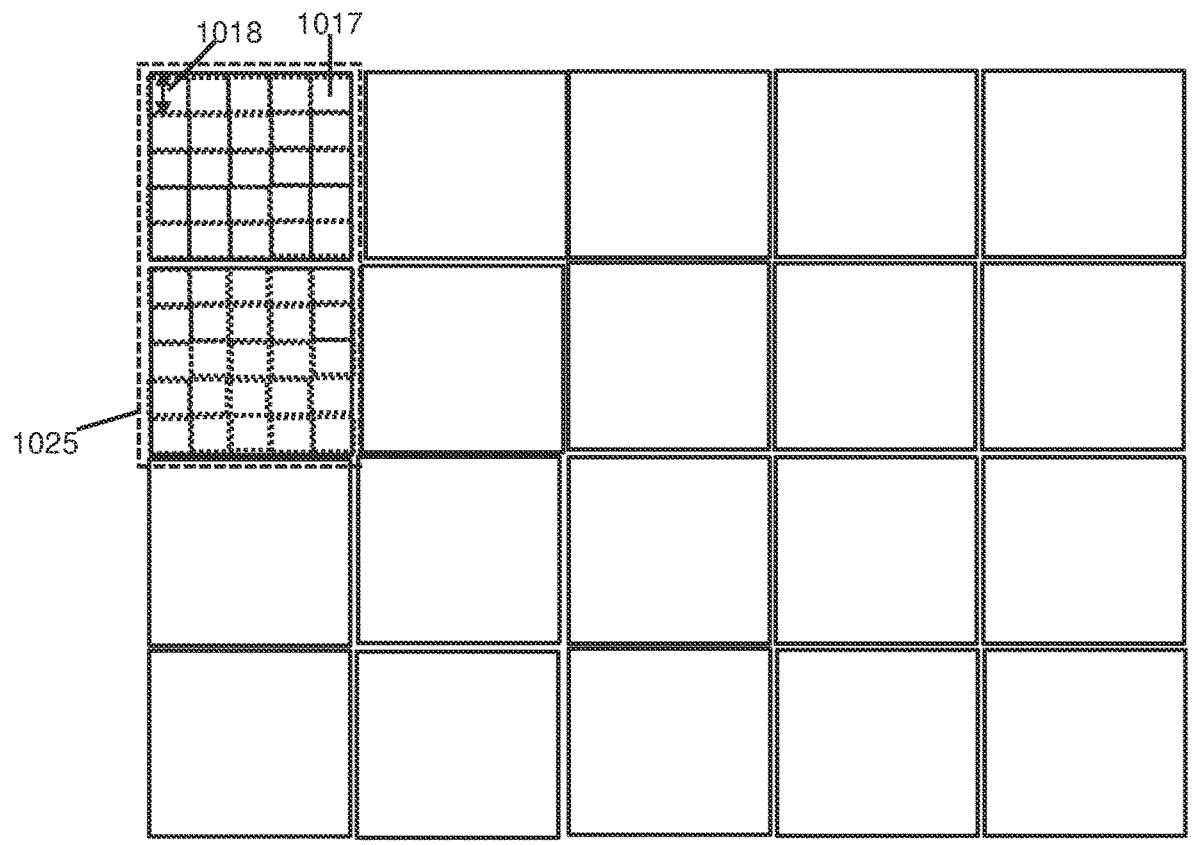
FIG. 10 illustrates an example of a division of an image of the region covering a plurality of dies into a plurality of pixel blocks, for processing of the image.

As already mentioned above, an extended die can correspond to a given die (see 990 in FIG. 9) with one or more separating areas (991) separating the given die from other adjacent dies.

According to some embodiments, the dimension of each region can be selected as a multiple of the dimension (along the Y direction) of an extended die, in order to exactly cover a number N of extended dies (with N an integer equal to, or greater than two). In this case, the dimension of each region can be selected to meet at least two conditions: (1) being equal to or greater than $D_{region\_Y\_threshold\_1}$, (2) exactly covering N dies (or covering exactly N extended dies)—this second condition can be met by selecting the dimension of the region (along the Y axis) as a multiple of the dimension of an extended die.

According to some embodiments, a dimension of each region is selected to ensure that the total parallel computation power used by the examination system to process an image of the region will meet the required threshold (this is ensured by selecting a dimension of the region along the Y axis which is equal to or greater than $D_{region\_Y\_threshold\_1}$), while being as small as possible. In particular, a dimension of each region is selected to ensure that the total parallel computation power used by the examination system to process an image of the region will meet the required threshold, while exactly covering (along the Y axis) a number N (an integer) of extended dies which is as minimal as possible. Therefore, operation 870 can include selecting a number N of extended dies (with N an integer equal to or greater than two) for the dimension $D_{region\_Y}$ of each region, such that $D_{region\_Y}$ is the smallest value which is equal to or above the threshold $D_{region\_Y\_threshold\_1}$ extracted from the database. In the non-limitative example of FIG. 9, the region 925 covers two extended dies (N is equal to two).

One reason for this criterion is that the examination system generally performs die-to-die comparison in order to determine data informative of the specimen (e.g., defects). When fused regions are used as proposed in the methods described above, the examination system will perform region-to-region comparison. Therefore, if regions of too large size are used, the comparison will be less relevant in order to detect defects or extract other data of interest.

In a non-limitative example, assume that the maximal number of DSPs which can be used by the examination system for parallel processing of an image of a given die is 60 DSPs, that the recipe has to use an illumination spot with a dimension $W_{spot\_1}$ equal to 0.765 mm, and that the dimension $D_{die\_Y\_1}$ of each die is equal to 1.6 mm. Since the dimension of the illumination spot is equal to 0.765 mm, then the minimal dimension of the region along axis Y, which enables usage of the maximal number of DSPs by the examination system, when processing an image of this region, is equal to 2.7 mm (as shown in the table of FIG. 7D). Since the actual dimension of a die (1.6 mm) is smaller than 2.7 mm, the method outputs that fused regions have to be determined. This can be output in the user interface, in order to alert the user that fused regions need to be determined. The dimension of each fused region can be selected to exactly cover a number N (integer) of extended dies (an extended die covers the die and its scribe lines along the Y axis), while being as close as possible to the threshold of 2.7 mm. For example, if the dimension of each extended die is 1.65 nm along the Y axis, then the method outputs that each region needs to cover 2 extended dies (since N=2 is the smallest value which ensures a dimension of the region to be both a multiple of 1.7 mm and to be greater than the threshold of 2.7 mm).

Once the dimension of the region has been determined, it can be communicated to the examination system. The examination system will acquire each region with this dimension and will automatically select a total parallel computation power for processing the image of each region which is equal to or larger than the required threshold.

If the comparison of operation 860 indicates that no fusion of dies is needed to generate the recipe (operation 880—this corresponds to a configuration in which the dimension of each die is greater than $D_{region\_Y\_threshold\_1}$), the actual dimension of each die (without fusion) can be communicated to the examination system. The optimized recipe therefore relies on the actual dimension of each die. The examination system will automatically use a total parallel computation power for processing the image of each die which is equal to or above the threshold.

According to some embodiments, for each die, the examination system is operative to process a plurality of pixel blocks 1017 covering an image of the die using a total parallel computation power which is selected depending on a dimension of the die, a dimension of the illumination spot of the examination system, and a dimension of each pixel block. This can be expressed by the following equation (this equation is not limitative):

$$N_{DSP} = \frac{D_{die\_Y}}{D_{block} W_{spot}} \qquad \text{Equation 2}$$

In this equation, $D_{block}$ corresponds to the dimension (see reference 1018) of each pixel block (a block is an area of pixels). It can be measured in number of rows per block: the higher the number of rows, the longer the dimension of the pixel block, and the smaller the number of rows, the smaller the dimension of the pixel block.

$D_{block}$ can be a parameter of the examination system. The higher the value of $D_{block}$, the higher the sensitivity of the processing of the image by the examination system. The smaller the value of $D_{block}$, the smaller the sensitivity of the processing of the image by the examination system. Note that $D_{block}$ can belong to a predefined range, between $D_{block\_min}$ (below this value, the sensitivity is too low to perform a processing of the image) and $D_{block\_max}$ (maximal dimension of each pixel block accepted by the examination system).

The method can include selecting a given dimension of pixel block which is above a threshold. This threshold ensures that the level of sensitivity of the examination system when processing the images is sufficient. For example, the threshold is equal to 500 rows per block (each row has a predefined height). This value can be communicated to the examination system, which will automatically divide the image of each region into pixel blocks of this given dimension.

The method can include, for this given dimension of pixel block, selecting the dimension $D_{region\_Y}$ of each given region 1025 to cover a number N of dies of the specimen which enables the examination system to process the plurality of pixel blocks covering the given region with a total parallel computation power which is larger than the threshold, wherein each pixel block of the plurality of pixel blocks has the given dimension.

This can include using Equation 2 to generate a database, which provides, for each dimension of the illumination spot, the minimal dimension of the region which ensures that the total parallel computing power used by the examination system is equal to or larger than the threshold, and for which each pixel block of the plurality of pixel blocks covering the image of the region has the given dimension.

There has been described, with reference to FIGS. 4A to 4D, a method of obtaining data $D_{geometrical\_die}$ informative of one or more geometrical properties of elements present in a die, and using data $D_{geometrical\_die}$ to automatically generate data $D_{geometrical\_region}$ informative of one or more geometrical properties of elements present in each region. Note that this method can be used similarly when fusing dies into a region along the Y axis (as described above), and therefore, this method is not described again.

There has been described, with reference to FIG. 5, a method of determining location of separating areas in the region, and indicating this location to the examination system (which can therefore ignore theses areas in the processing of the region). Note that this method can be used similarly when fusing dies into a region along the Y axis (since each region can cover N extended dies along the Y axis, which therefore includes one or more separating areas), and therefore, this method is not described again.

There has been described, with reference to FIGS. 6A and 6B, a method of acquiring, by the examination system, a given region of the specimen covering at least a first die and a second die, and processing the given region to determine data $D_{defect\_region}$ informative of the given region in a referential of the given region, and converting data $D_{defect\_region}$ into first data $D_{defect\_die\_1}$ informative of the first die expressed in a referential of the first die and second data $D_{defect\_die\_2}$ informative of the second die expressed in a referential of the second die. Note that this method can be used similarly when fusing dies into a region along the Y axis (since each region can cover N dies along the Y axis), and therefore this method is not described again.

Various methods have been described above which can be used to fuse a plurality of dies along a first direction (e.g., X direction) and various methods which can be used to fuse a plurality of dies along a second direction (e.g., Y direction), different from the first direction.

According to some embodiments, the two methods (fusion of dies along X axis and Y axis) can be combined to provide a complete solution which can fuse dies along X and/or Y direction, in order to generate an optimized recipe. This is illustrated in FIG. 11.

Figure 11:
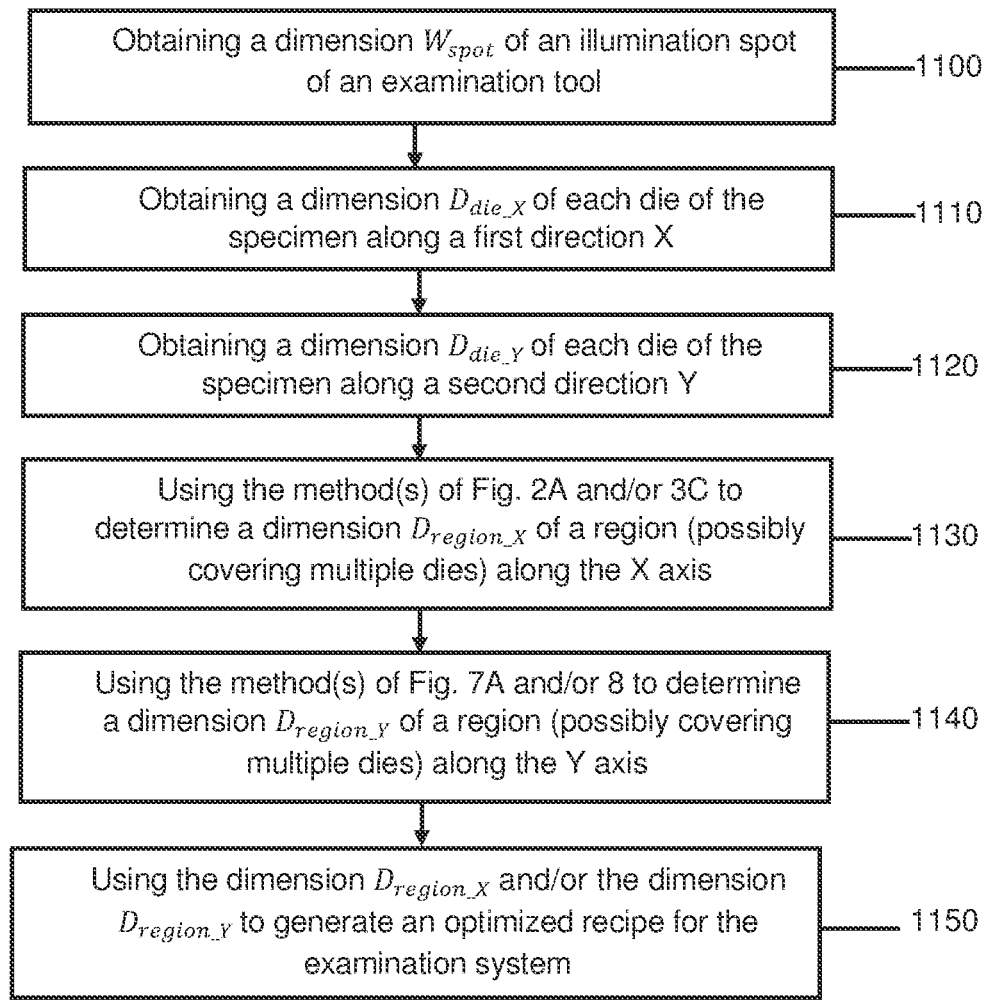
FIG. 11 illustrates a generalized flow-chart of another method of determining regions covering a plurality of dies, which combines two different methods, for enabling generation of an optimized recipe.

The method of FIG. 11 includes obtaining (operation 1100) a dimension $W_{spot}$ of an illumination spot of an examination system.

The method further includes obtaining (operation 1110) a dimension $D_{die\_X}$ of each die of the specimen along a first direction X (e.g., a direction orthogonal to the scanning direction).

The method further includes obtaining (operation 1120) a dimension $D_{die\_Y}$ of each die of the specimen along a second direction Y (e.g., along the scanning direction), orthogonal to the first direction X. In some cases, the die has the same dimension along the first direction and the second direction, and it is therefore not needed to obtain two dimensions $D_{die\_X}$ and $D_{die\_Y}$.

The method further includes using (operation 1130) the method(s) of FIGS. 2A and/or 3C to determine a dimension $D_{region\_X}$ of a region (possibly covering multiple dies) along the X axis. The method determines whether it is necessary to fuse multiple dies, in order to have a total level of overlap of the slices acquired by the examination system which meets the optimization criterion.

The method further includes using (operation 1140) the method(s) of FIGS. 7A and/or 8 to determine a dimension $D_{region\_Y}$ of a region (possibly covering multiple dies) along the Y axis. The method determines whether it is necessary to fuse multiple dies, in order to ensure that the examination system will process an image of the region with a total parallel computation power which is equal to or larger than a threshold.

The method further includes using the dimension $D_{region\_X}$ and/or the dimension $D_{region\_Y}$ to generate an optimized recipe for the examination system. In this optimized recipe, the examination system is instructed to acquire each region of a plurality of regions, wherein each region has the dimension $D_{region\_X}$ along the X axis and the dimension $D_{region\_Y}$ along the Y axis.

By virtue of the selection of these dimensions for the region, the total level of overlap of the slices acquired by the examination system meets the optimization criterion, and the total parallel computation power used by the examination system is equal to or larger than the threshold.

Figure 12:
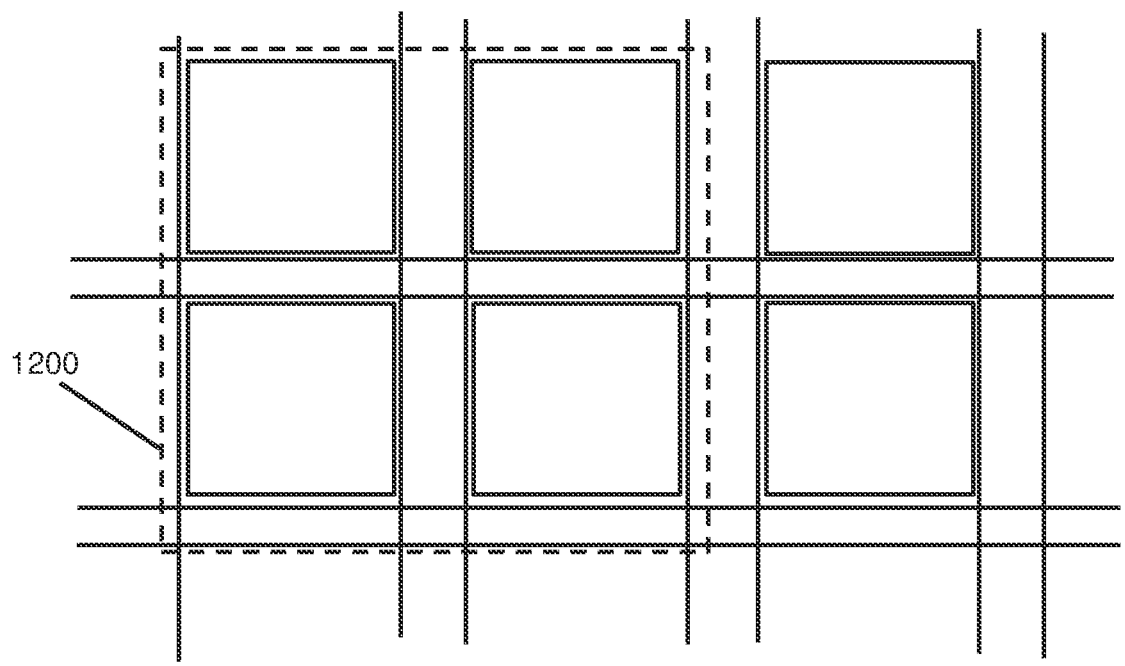
FIG. 12 illustrates an example of a region covering a plurality of dies and areas separating the dies, obtained using the method of FIG. 11.

A non-limitative of a region 1200 which fuses dies, both along the X and the Y directions, is illustrated in FIG. 12, in which the region covers two dies (two extended dies) along the X axis, and two dies (two extended dies) along the Y axis.

As mentioned above (see FIG. 4A), the method can automatically convert geometrical properties provided by a user in the referential of a die, into the referential of a region. This method can be used similarly for a region which covers multiple dies, both in the X direction and in the Y direction. This conversion can use the known dimension of the dies and of the separating areas, $D_{region\_X}$, and $D_{region\_Y}$.

Similarly, as mentioned above (see FIG. 5), the method can indicate to the examination system the location of the separating areas (scribe lines) within each region. Indeed, each region can cover a plurality of extended dies, including the separating areas which can be ignored by the examination system in the processing stage. This method can be used similarly for a region which covers multiple dies, both in the X direction and in the Y direction. This conversion can use the known dimension of the dies and of the separating areas, $D_{region\_X}$, and $D_{region\_Y}$.

As mentioned above (see FIG. 6B), the examination system provides data in the referential of the region, which can be automatically converted in the referential of a die. This method can be used similarly for a region which covers multiple dies, both in the X direction and in the Y direction. This conversion can use the known dimension of the dies and of the separating areas, $D_{region\_X}$, and $D_{region\_Y}$.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system comprising a processor and memory circuitry (PMC), the PMC being configured to:

obtain a dimension $W_{spot}$ of an illumination spot of an examination system, enabling the examination system to acquire, along a scanning direction, first slices of a semiconductor specimen comprising a plurality of dies;

obtain data informative of at least one dimension $D_{die_X}$ of each die of the plurality of dies of the semiconductor specimen, wherein said dimension is defined along a direction orthogonal to the scanning direction;

use $W_{spot}$ to determine, along said direction, a dimension $D_{region_X}$ of each region of a plurality of regions to acquire in the semiconductor specimen, wherein the dimension $D_{region_X}$ is larger than the dimension $D_{die_X}$, wherein the dimension $D_{region_X}$ is selected to enable generation of an optimized recipe, in which acquisition of the plurality of regions by the examination system is associated with a total level of overlap between second slices acquired by the examination system which meets an optimization criterion; and use the dimension $D_{region_X}$ to cause generation of said optimized recipe for the examination system, thereby enabling acquisition of the plurality of regions of the specimen by the examination system.

2. The system of claim 1, wherein at least one of (i) or (ii) or (iii) is met:
(i) each region covers a plurality of dies of the specimen and areas separating dies of said plurality of dies;
(ii) the dimension $D_{region_X}$ is selected to enable each region of the plurality of regions to cover a number N of dies of the specimen, with N an integer which is equal to or greater than two; or
(iii) the specimen comprises a plurality of extended dies, each extended die comprising a die and one or more areas separating said die from one or more other dies, wherein the dimension $D_{region_X}$ is selected to enable each region of the plurality of regions to cover N extended dies, with N an integer equal to or greater than two.

3. The system of claim 1, wherein at least one of (i) or (ii) is met:
(i) the optimization criterion enables an impact of the total level of overlap of the second slices of the optimized recipe on a throughput of the examination system to be below a threshold; or
(ii) for an unoptimized recipe in which a plurality of areas is acquired by the examination system, wherein each area of the plurality of areas has the dimension $D_{die_X}$ along the direction orthogonal to the scanning direction, a first total level of overlap of third slices acquired by the examination system is obtained,
for the optimized recipe in which a plurality of regions is acquired by the examination system, wherein each region has the dimension $D_{region_X}$ along the direction orthogonal to the scanning direction, a second total level of overlap of the ssecond slices acquired by the examination system is obtained, and
wherein the second total level of overlap is smaller than the first total level of overlap.

4. The system of claim 1, wherein the processor and memory circuitry is configured to select a dimension $D_{region_X}$ which both minimizes a number N of dies covered by each region along said direction orthogonal to the scanning direction, while enabling the total level of overlap of the second slices to meet the optimization criterion.

5. The system of claim 1, configured to use a database which stores, for each of a plurality of different values of a dimension of an illumination spot of the examination system, a threshold indicative of a minimal dimension of each region of the plurality of regions to acquire in the specimen, said threshold enabling a total level of overlap between the second slices acquired by the examination system for acquiring said plurality of regions, to meet the optimization criterion.

6. The system of claim 5, configured to:
for a given dimension $W_{spot_1}$ of the illumination spot, and a given dimension $D_{die_{X_1}}$ of each die of the specimen, perform a comparison between the given dimension $D_{die_{X_1}}$ and a threshold $D_{region_{X_{threshold_1}}}$ associated with the given dimension $W_{spot}$, in the database, and perform (i) or (ii):
(i) using said comparison to determine whether determination of a plurality of regions each having a larger dimension than $D_{die_{X_1}}$ is required to generate the optimized recipe; or
(ii) upon determination that a plurality of regions each having a larger dimension than $D_{die_{X_1}}$ is required to generate the optimized recipe, using $D_{region_{X_{threshold_1}}}$ to determine the dimension $D_{region_X}$ of each region of the plurality of regions.

7. The system of claim 1, wherein the PMC is configured to:
obtain input data $D_{geometrical_{die}}$ informative of one or more geometrical properties of elements present in a die of the specimen; and
use said data $D_{geometrical_{die}}$ to generate data $D_{geometrical_{region}}$ informative of one or more geometrical properties of elements present in each region covering at least two dies.

8. The system of claim 1, wherein the examination system is operative to perform, after acquisition of a given region of the plurality of regions, a processing of an image of said given region to determine data informative of said given region, wherein the PMC is operative to indicate to the examination system a location of areas separating dies within the given region.

9. The system of claim 1, wherein the examination system is operative to determine, for at least one given region covering at least a first die and a second die of the specimen, data $D_{defect_{region}}$ informative of the given region in a referential of the given region, wherein the PMC is operative to convert data $D_{defect_{region}}$ into first data $D_{defect_{die_1}}$ informative of the first die expressed in a referential of the first die and second data $D_{defect_{die_2}}$ informative of the second die expressed in a referential of the second die.

10. The system of claim 1, wherein the examination system is operative to process an image of a die using a total parallel computation power selected by the examination system, wherein the system is configured to:
obtain data informative of at least one dimension $D_{die_Y}$ of each die of the plurality of dies along the scanning direction;
use $D_{die_Y}$ and the dimension $W_{spot}$ to determine a dimension $D_{region_Y}$ of each region of the plurality of regions to acquire in the semiconductor specimen, wherein the dimension is determined along said scanning direction and is larger than the dimension $D_{die_Y}$, wherein the dimension $D_{region_Y}$ is selected to enable generation of an optimized recipe for which each region of the plurality of regions acquired by the examination system is associated with a total parallel computation power used by the examination system for processing an image of said region which is equal to or larger than a threshold; and
use the dimension $D_{region_Y}$ to enable generation of said optimized recipe for the examination system, thereby enabling acquisition of the plurality of regions of the specimen by the examination system, and processing of each region of the plurality of regions with a total parallel computation power which is equal to or larger than the threshold.

11. A system comprising a processor and memory circuitry (PMC) configured to:
obtain a dimension $W_{spot}$ of an illumination spot of an examination system operative to acquire images of a semiconductor specimen comprising a plurality of dies, wherein the examination system is operative to process an image of a die using a total parallel computation power selected by the examination system;
obtain data informative of at least one dimension $D_{die_Y}$ of each die of the plurality of dies along a given direction;
use $D_{die_Y}$ and the dimension $W_{spot}$ to determine a dimension $D_{region_Y}$ of each region of a plurality of regions to acquire in the semiconductor specimen, wherein the dimension $D_{region_Y}$ is determined along said given direction and is larger than the dimension $D_{die_Y}$,
wherein the dimension $D_{region_Y}$ is selected to enable generation of an optimized recipe for which each region of the plurality of regions acquired by the examination system is associated with a total parallel computation power used by the examination system for processing an image of said region which is equal to or larger than a threshold; and
use the dimension $D_{region_Y}$ to cause generation of said optimized recipe for the examination system, thereby enabling acquisition of the plurality of regions of the specimen by the examination system, and processing of each region of the plurality of regions with a total parallel computation power which is equal to or larger than the threshold.

12. The system of claim 11, wherein, for a given die, the examination system is operative to process an image of the given die using a total parallel computation power which is selected depending on a dimension of the given die and a dimension of the illumination spot,
wherein the system is configured to select the dimension $D_{region_Y}$ of each region to cover a number N of dies of the specimen which enables the examination system to process each region with a total parallel computation power which is equal to or larger than the threshold.

13. The system of claim 12, wherein (i) or (ii) met:
(i) each region covers a plurality of dies of the specimen and areas separating dies of said plurality of dies; or
(i) each region covers a plurality of dies of the specimen and areas separating dies of said plurality of dies, and the system is configured to indicate to the examination system a location of the areas separating the dies.

14. The system of claim 11, wherein, for a given die, the examination system is operative to process a plurality of pixel blocks covering an image of the given die using a total parallel computation power which is selected depending on a dimension of the die, a dimension of the illumination spot of the examination system, and a dimension of each pixel block,
wherein the system is configured to select, for a given dimension of pixel block which is equal to or larger than a required threshold, the dimension $D_{region_Y}$ of each region to cover a number N of dies of the specimen which enables the examination system to process, for each given region of the plurality of regions, a plurality of pixel blocks covering the given region, wherein each pixel block is of said given dimension, with a total parallel computation power which is equal to or larger than the threshold.

15. The system of claim 11, wherein the total parallel computation power used for processing the image of the region meets the threshold when a number of processors of the examination system operating in parallel for processing the image of the region corresponds to a maximal number of processors allowed by the examination system for processing an image of a die.

16. The system of claim 11, wherein each region covers a first die and a second die, wherein a number of processors of the examination system operating in parallel for processing the image of the region is larger than a number of processors that the examination system would have used in parallel for processing an image of the first die, thereby improving a throughput of the examination system.

17. The system of claim 11, configured to:
obtain data informative of at least one dimension $D_{die_X}$ of each die of the plurality of dies of the semiconductor specimen, wherein said dimension is defined along a direction orthogonal to the given direction;
use $W_{spot}$ to determine, along said direction, a dimension of each region of a plurality of regions to acquire in the semiconductor specimen, wherein the dimension $D_{region_X}$ is larger than the dimension $D_{die_X}$,
wherein the dimension $D_{region_X}$ is selected to enable generation of an optimized recipe in which acquisition of the plurality of regions by the examination system is associated with a total level of overlap between the slices acquired by the examination system which meets an optimization criterion; and
use the dimension $D_{region_X}$ to enable generation of said optimized recipe for the examination system, thereby enabling acquisition of the plurality of regions of the specimen by the examination system.

18. The system of claim 11, configured to use a database which stores, for each of a plurality of different values of a dimension of an illumination spot of the examination system, a threshold indicative of a minimal dimension along said given direction of each region of the plurality of regions to acquire in the specimen, said threshold enabling processing of an image of each region by the examination system with a total parallel computation power which is equal to or larger than a threshold.

19. The system of claim 11, configured to:
obtain input data $D_{geometrical_{die}}$ informative of one or more geometrical properties of elements present in a die of the specimen; and
use said data $D_{geometrical_{die}}$ to generate data $D_{geometrical_{region}}$ informative of one or more geometrical properties of elements present in each region covering at least two dies.

20. A non-transitory computer readable medium comprising instructions that, when executed by a one or more computers, cause the one or more computers to perform at least one of (i) or (ii):
(i) obtaining a dimension $W_{spot}$ of an illumination spot of an examination system, enabling the examination system to acquire, along a scanning direction, first slices of a semiconductor specimen comprising a plurality of dies, obtaining data informative of at least one dimension $D_{die_X}$ of each die of the plurality of dies of the semiconductor specimen, wherein said dimension is defined along a direction orthogonal to the scanning direction, using $W_{spot}$ to determine, along said direction, a dimension $D_{region_X}$ of each region of a plurality of regions to acquire in the semiconductor specimen, wherein the dimension $D_{region_X}$ is larger than the dimension $D_{die_X}$, wherein the dimension $D_{region_X}$ is selected to enable generation of an optimized recipe in which acquisition of the plurality of regions by the examination system is associated with a total level of overlap between second slices acquired by the examination system which meets an optimization criterion, and using the dimension $D_{region_X}$ to cause generation of said optimized recipe for the examination system, thereby enabling acquisition of the plurality of regions of the specimen by the examination system; or (ii) obtaining a dimension $W_{spot}$ of an illumination spot of the examination system operative to acquire images of a semiconductor specimen comprising a plurality of dies, wherein the examination system is operative to process an image of a die using a total parallel computation power selected by the examination system, obtaining data informative of at least one dimension $D_{die_Y}$ of each die of the plurality of dies along a given direction, using $D_{die_Y}$ and the dimension $W_{spot}$ to determine a dimension $D_{region_Y}$ of each region of a plurality of regions to acquire in the semiconductor specimen, wherein the dimension $D_{region_Y}$ is determined along said given direction and is larger than the dimension $D_{die_Y}$, wherein the dimension $D_{region_Y}$ is selected to enable generation of an optimized recipe for which each region of the plurality of regions acquired by the examination system is associated with a total parallel computation power used by the examination system for processing an image of said region which is equal to or larger than a threshold, and using the dimension $D_{region_Y}$ to cause generation of said optimized recipe for the examination system, thereby enabling acquisition of the plurality of regions of the specimen by the examination system, and processing of each region of the plurality of regions with a total parallel computation power which is equal to or larger than the threshold.

\* \* \* \* \*